US012122172B2

(12) United States Patent
Murayama

(10) Patent No.: US 12,122,172 B2
(45) Date of Patent: Oct. 22, 2024

(54) CASSETTE

(71) Applicant: BROTHER KOGYO KABUSHIKI KAISHA, Nagoya (JP)

(72) Inventor: Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/489,737

(22) Filed: Sep. 29, 2021

(65) Prior Publication Data

US 2022/0016919 A1 Jan. 20, 2022

Related U.S. Application Data

(63) Continuation of application No. PCT/JP2020/011090, filed on Mar. 13, 2020.

(30) Foreign Application Priority Data

Mar. 31, 2019 (JP) ................................ 2019-069567

(51) Int. Cl.
*B41J 32/00* (2006.01)
*B41J 3/36* (2006.01)
(Continued)

(52) U.S. Cl.
CPC ................ *B41J 32/00* (2013.01); *B41J 3/36* (2013.01); *B41J 15/044* (2013.01); *B41J 15/06* (2013.01); *B41J 31/10* (2013.01)

(58) Field of Classification Search
None
See application file for complete search history.

(56) References Cited

U.S. PATENT DOCUMENTS 3,672,603 A 6/1972 Swain
3,804,227 A 4/1974 Cappotto et al.
(Continued)

FOREIGN PATENT DOCUMENTS

AU 9226101 A 4/2002
CA 1119549 A 3/1982
(Continued)

OTHER PUBLICATIONS

International Search Report and Written Opinion of the International Search Report for PCT/JP2020/011090 dated Jun. 9, 2020.
(Continued)

*Primary Examiner* — Matthew G Marini
(74) *Attorney, Agent, or Firm* — KENEALY VAIDYA LLP

(57) ABSTRACT

A cassette includes: a case including a first layer and a second layer and having a head space at the first layer; and a roll disposed at the second layer and into which a medium to be printed is wound about a rotation axis in a winding direction. The medium to be printed includes a to-be-printed layer and a release layer, and is disposed at the case such that the to-be-printed layer is on an inner side thereof and the release layer is on an outer side thereof in the winding direction. The case has a conveyance path for conveying the medium to be printed. The conveyance path is defined such that the medium to be printed is conveyed in the winding direction from the roll to the head space through an opening defined at a boundary between the first layer and the second layer in the case.

15 Claims, 14 Drawing Sheets

(51) Int. Cl.

| | |
|---|---|
| ***B41J 15/04*** | (2006.01) |
| ***B41J 15/06*** | (2006.01) |
| ***B41J 31/10*** | (2006.01) |

(56) References Cited

U.S. PATENT DOCUMENTS

| | | | | |
|---|---|---|---|---|
| 3,823,808 | A | 7/1974 | Murata et al. | |
| 4,034,935 | A | 7/1977 | Plaza et al. | |
| 4,402,619 | A | 9/1983 | Paque et al. | |
| 4,404,568 | A | 9/1983 | Kikuchi et al. | |
| 4,424,964 | A | 1/1984 | Kikuchi et al. | |
| 4,425,568 | A | 1/1984 | Moriguchi et al. | |
| 4,463,360 | A | 7/1984 | Kikuchi et al. | |
| 4,668,961 | A * | 5/1987 | Hiramatsu | B41J 35/06 400/208 |
| 5,216,441 | A | 6/1993 | Isobe | |
| 2007/0147937 | A1 * | 6/2007 | Hioki | C09J 7/38 400/613 |
| 2007/0222615 | A1 | 9/2007 | Yamaguchi et al. | |
| 2010/0247209 | A1 | 9/2010 | Yamaguchi et al. | |
| 2011/0143073 | A1 | 6/2011 | Vandermeulen | |
| 2015/0375527 | A1 | 12/2015 | Torii | |
| 2017/0190195 | A1 | 7/2017 | Kosuge et al. | |

FOREIGN PATENT DOCUMENTS

| | | | |
|---|---|---|---|
| CN | 101042821 | A | 9/2007 |
| CN | 101850673 | A | 10/2010 |
| CN | 104044374 | A | 9/2014 |
| CN | 105313507 | A | 2/2016 |
| CN | 207224868 | U | 4/2018 |
| EP | 0473132 | A2 | 3/1992 |
| EP | 2310208 | A1 | 4/2011 |
| GB | 2016411 | A | 9/1979 |
| JP | S50-36734 | B1 | 11/1975 |
| JP | S52-064310 | A | 5/1977 |
| JP | S54-111914 | A | 9/1979 |
| JP | S57-103861 | A | 6/1982 |
| JP | S59-095180 | A | 6/1984 |
| JP | S60-36255 | U | 3/1985 |
| JP | S60-48456 | U | 4/1985 |
| JP | S60-224571 | A | 11/1985 |
| JP | S63-156762 | U | 10/1988 |
| JP | H02-9562 | U | 1/1990 |
| JP | H02-37568 | Y2 | 10/1990 |
| JP | H03-284973 | A | 12/1991 |
| JP | H04-110172 | A | 4/1992 |
| JP | H04-152176 | A | 5/1992 |
| JP | 06-328800 | A * | 11/1994 |
| JP | H08-39908 | A | 2/1996 |
| JP | H09-202024 | A | 8/1997 |
| JP | 2002-308518 | A | 10/2002 |
| JP | 2003-326767 | A | 11/2003 |
| JP | 2004-255656 | A | 9/2004 |
| JP | 2009-162823 | A | 7/2009 |
| JP | 2009-196804 | A | 9/2009 |
| JP | 2011-37223 | A | 2/2011 |
| JP | 2016-71238 | A | 5/2016 |
| WO | 02/32681 | A1 | 4/2002 |
| WO | 2010/015666 | A1 | 2/2010 |
| WO | 2010/125127 | A1 | 11/2010 |

OTHER PUBLICATIONS

Chinese Office Action for the related Chinese Patent Application No. 202080026151.8 dated Jan. 19, 2023.

Chinese Office Action for the related Chinese Patent Application No. 202080026151.8 dated May 7, 2022.

International Preliminary Report on Patentability and English language Written Opinion of the International Search Report for PCT/JP2020/011090 dated Sep. 28, 2021.

Office Action for the related Chinese Patent Application No. 202080026151.8 dated Aug. 18, 2023.

Office Action for the related European Patent Application No. 20784742.7 dated Jun. 14, 2023.

Office Action for the related Japanese Patent Application No. 2023-135915 dated Sep. 3, 2024.

* cited by examiner

CASSETTE

CROSS-REFERENCE TO RELATED APPLICATIONS

This is a continuation application of International Application No. PCT/JP2020/011090 filed on Mar. 13, 2020 which claims priority from Japanese Patent Application No. 2019-069567 filed on Mar. 31, 2019. The entire contents of the earlier applications are incorporated herein by reference.

TECHNICAL FIELD

Aspects of the disclosure relate to a cassette to be detachably attached to a printing device.

BACKGROUND

Conventionally known is a cassette, for example, detachably attachable to a small-sized printing device and to be used therein. In the known cassette, in its cassette body 1, a feed reel 3 of an ink ribbon 4 is disposed in a first space defined between a cassette lid 2 and a partition plate 6, and a take-up reel 7 of the ink ribbon 4 is disposed in a second space defined below the partition plate 6. As a drive roller 8 is rotated by a drive means of the printing device, an elastic belt 9 extending between the drive roller 8 and a following roller 10 runs to cause rotation of the take-up reel 7. Thus, the ink ribbon 4 is conveyed downward from the first space to the second space after a constant feeding tension is applied to the ink ribbon 4 by a tension roller 5.

SUMMARY

In such a cassette, before the ink ribbon 4 is conveyed downward from the first space to the second space, the ink ribbon 4 is once turned by the tension roller 5 by approximately 180° around an axis of the tension roller 5, that is, an inner side and an outer side of the ink ribbon 4 are once changed by the tension roller 5. Thus, there has been a problem that in a case where such a cassette using the ink ribbon 4 as disclosed in Patent Literature 1 is applied to, for example, a cassette using a medium to be printed including a to-be-printed layer and a release layer, the medium to be printed might not be conveyed smoothly due to peeling of the release layer from the to-be-printed layer when an inner side and an outer side of the medium to be printed are changed.

The disclosure has been made in view of the above circumstances, and aspects of the disclosure provide a cassette in which a medium to be printed including a to-be-printed layer and a release layer may be conveyed smoothly.

In one or more aspects of the disclosure, a cassette may include: (a) a case including a first layer and a second layer and having a head space at the first layer; and (b) a roll disposed at the second layer and into which a medium to be printed is wound about a rotation axis in a winding direction, wherein: (c) the medium to be printed includes a to-be-printed layer and a release layer, the medium to be printed is disposed at the case such that the to-be-printed layer is on an inner side of the medium to be printed in the winding direction and the release layer is on an outer side of the medium to be printed in the winding direction; (d) the case has a conveyance path for conveying the medium to be printed; and (e) the conveyance path is defined such that the medium to be printed is conveyed in the winding direction from the roll to the head space through an opening defined at a boundary between the first layer and the second layer in the case. The medium to be printed is thus conveyed in the winding direction from the roll to the head space along the conveyance path defined in the case. This may reduce a possibility that the release layer peels off from the to-be-printed layer due to changing of the inner side and the outer side of the medium to be printed during conveyance of the medium to be printed as conventionally occurred. Consequently, the medium to be printed including the to-be-printed layer and the release layer may be smoothly conveyed.

DETAILED DESCRIPTION

Hereinafter, an illustrative embodiment of the disclosure will be described with reference to the drawings.

First Illustrative Embodiment

Figure 1:
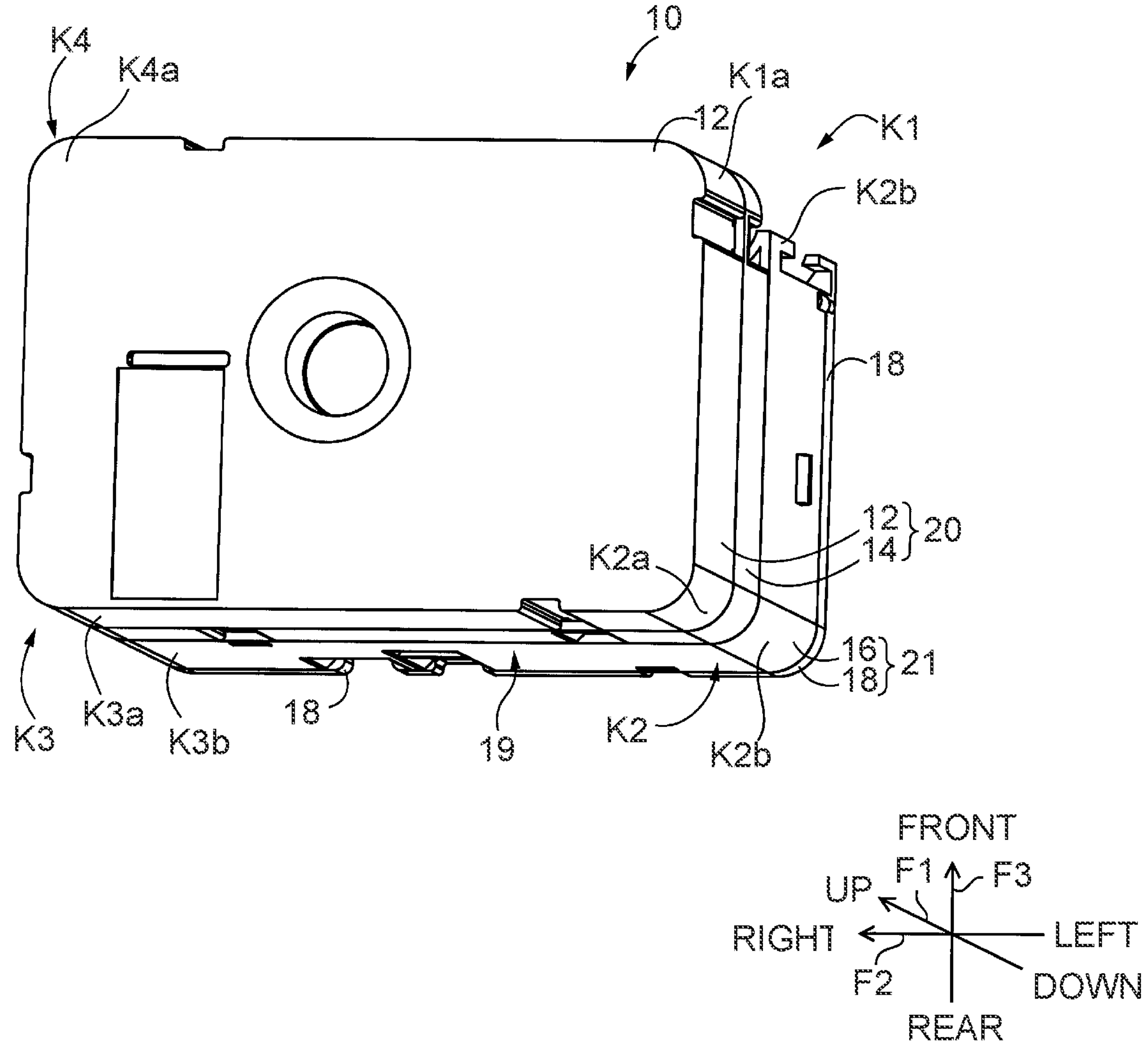
FIG. 1 is a perspective view illustrating an upper surface side of a cassette according to an illustrative embodiment of the disclosure.
Figure 2:
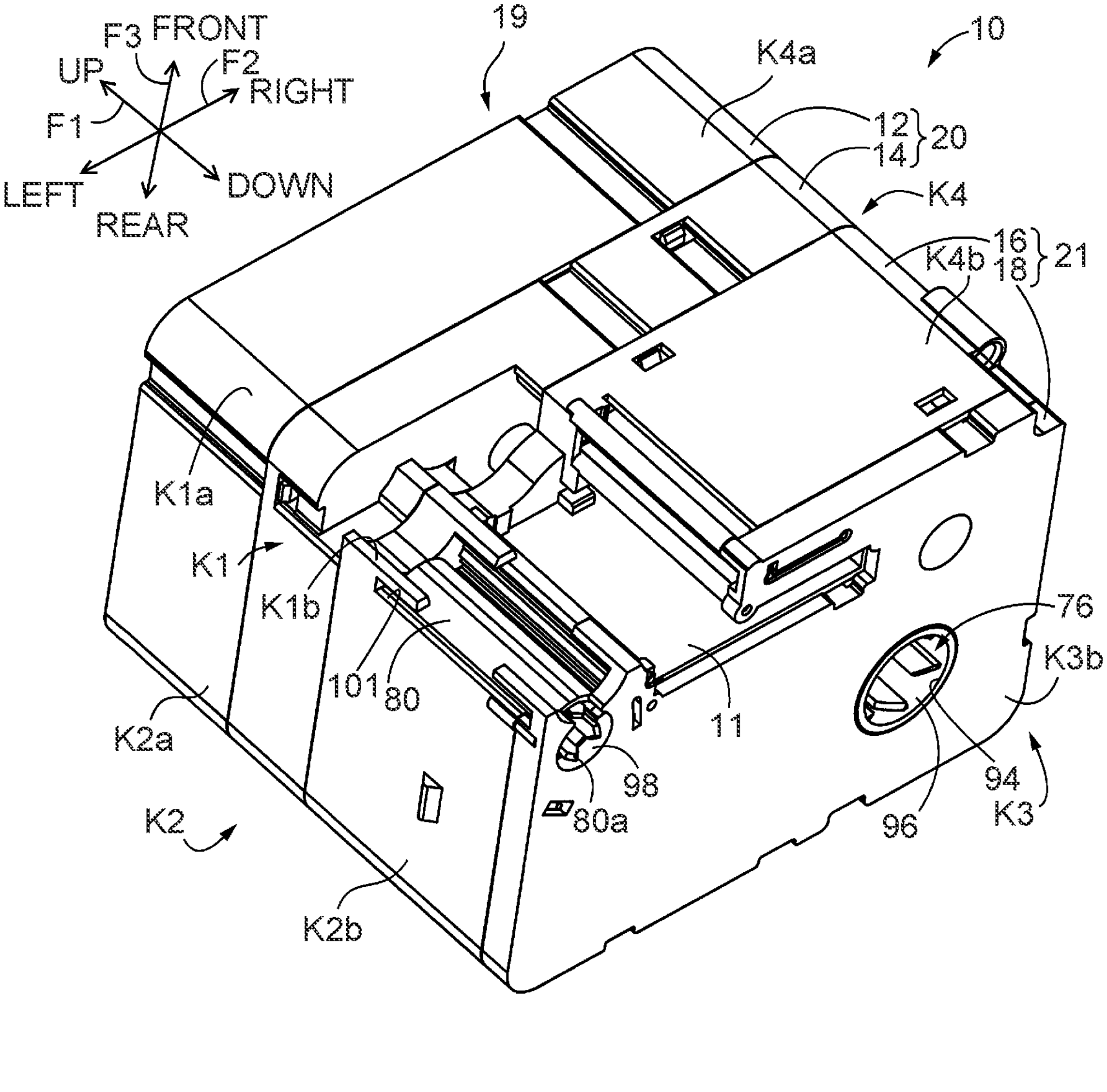
FIG. 2 is a perspective view illustrating a lower surface side of the cassette FIG. 1.
Figure 3:
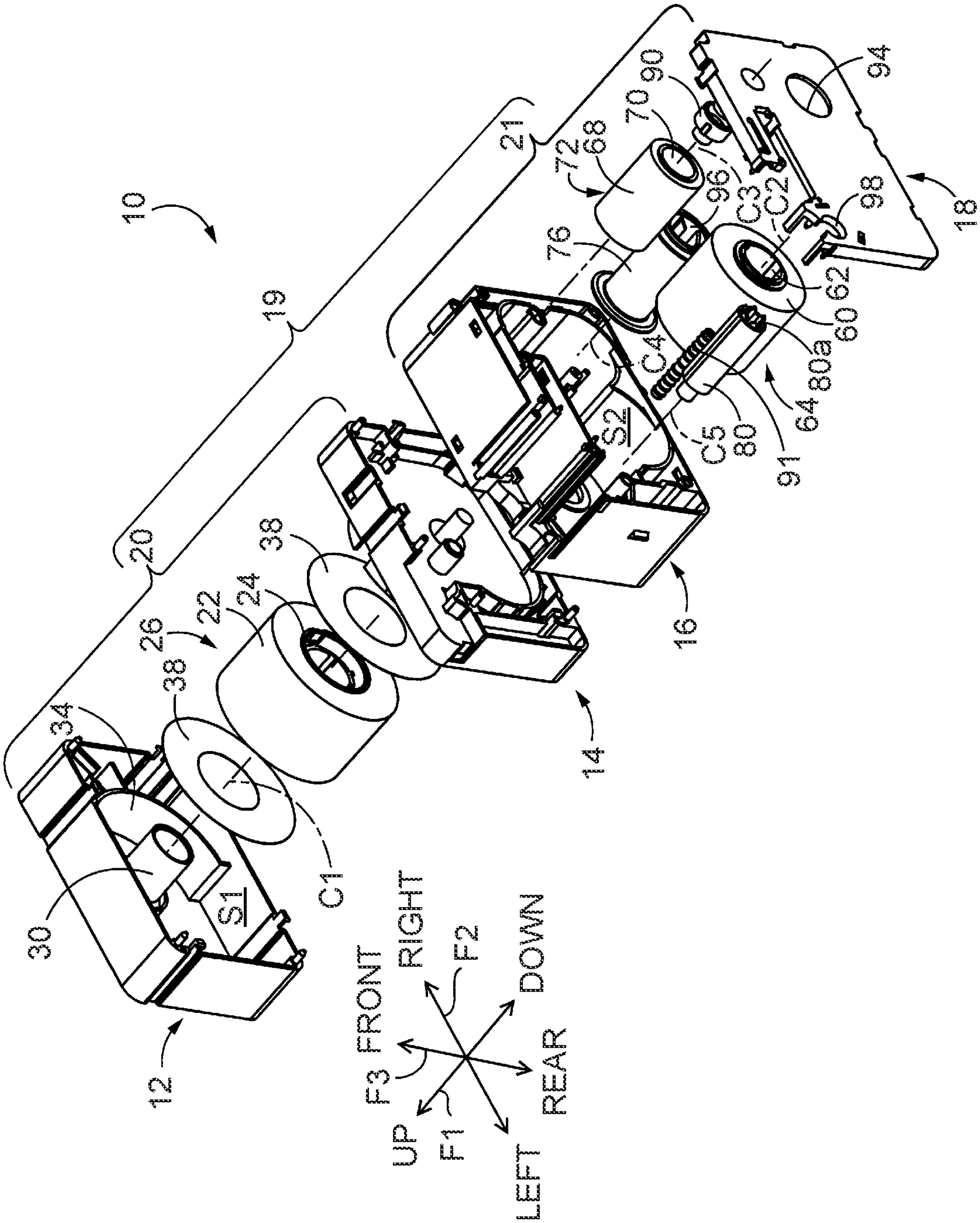
FIG. 3 is a perspective view illustrating a configuration of a case of the cassette of FIG. 1 and an internal configuration of the case of the cassette, wherein a first case member, a second case member, a third case member, and a fourth case member constituting the case are disassembled.

FIG. 1 is a perspective view of a cassette 10 according to an illustrative embodiment of the disclosure, when viewed from an obverse surface side, that is, an upper surface side, of the cassette 10. FIG. 2 is a perspective view of the cassette 10, when viewed from a back surface side, that is, a lower surface side, of the cassette 10. FIG. 3 is a perspective view illustrating an internal configuration of a case (e.g., a case) 19 of the cassette 10 and an internal configuration of the cassette 10, wherein a first case member 12, a second case member (e.g., an upper case) 14, a third case member (e.g., a lower case) 16, and a fourth case member 18 constituting the cassette 10 are disassembled. The cassette 10 is a laminated type cassette. The cassette 10 has a rectangular parallelepiped shape as a whole. The cassette 10 is to be detachably attached to a cassette mounting portion 104 of a printer, that is, a printing device 102 illustrated in FIG. 21. The case 19 of the cassette 10 includes a tape case (e.g., a second layer) 20 having a first space S1 therein and a ribbon case (e.g., a first layer) 21 having a second space S2 therein. A printing tape roll (e.g., a roll) 26 is disposed in the first space S1. An ink ribbon roll 72 is disposed in the second space S2. The tape case 20 includes the first case member 12 and the second case member 14. The ribbon case 21 includes the third case member 16 and the fourth case member 18. In the case 19, the first case member 12, the second case member 14, the third case member 16, and the fourth case member 18 include locking claws 27, fixing holes 28, and positioning projections 29 at appropriate positions of their outer peripheral walls. The first case member 12, the second case member 14, the third case member 16, and the fourth case member 18 are fixed to each other in a stacked manner by engagement between the locking claws 27 and the fixing holes 28 while the first case member 12, the second case member 14, the third case member 16, and the fourth case member 18 are positioned relative to each other by the positioning projections 29. The tape case 20 defining the first space S1 corresponds to the second layer of the case 19 of the cassette 10. The ribbon case 21 defining the second space S2 corresponds to the first layer of the case 19 of the cassette 10.

In FIG. 2, a coupling hole % of a take-up spool 76 is exposed from a bottom surface of the fourth case member 18 of the cassette 10 through a take-up spool support hole 94. When the cassette 10 is mounted on the cassette mounting portion 104 of the printing device 102, a take-up spool drive shaft 108 disposed at the cassette mounting portion 104 is inserted in the coupling hole 96. The third case member 16 and the fourth case member 18 has a recessed groove (e.g., a head space) 11 at their side surfaces. When the cassette 10 is mounted on the cassette mounting portion 104 of the printing device 102, a print head 106 disposed at the cassette mounting portion 104 is inserted to the recessed groove 11. In other words, the ribbon case 21 has, at its side surface, the recessed groove 11 to which the print head 106 is inserted when the cassette 10 is mounted on the cassette mounting portion 104.

Figure 4:
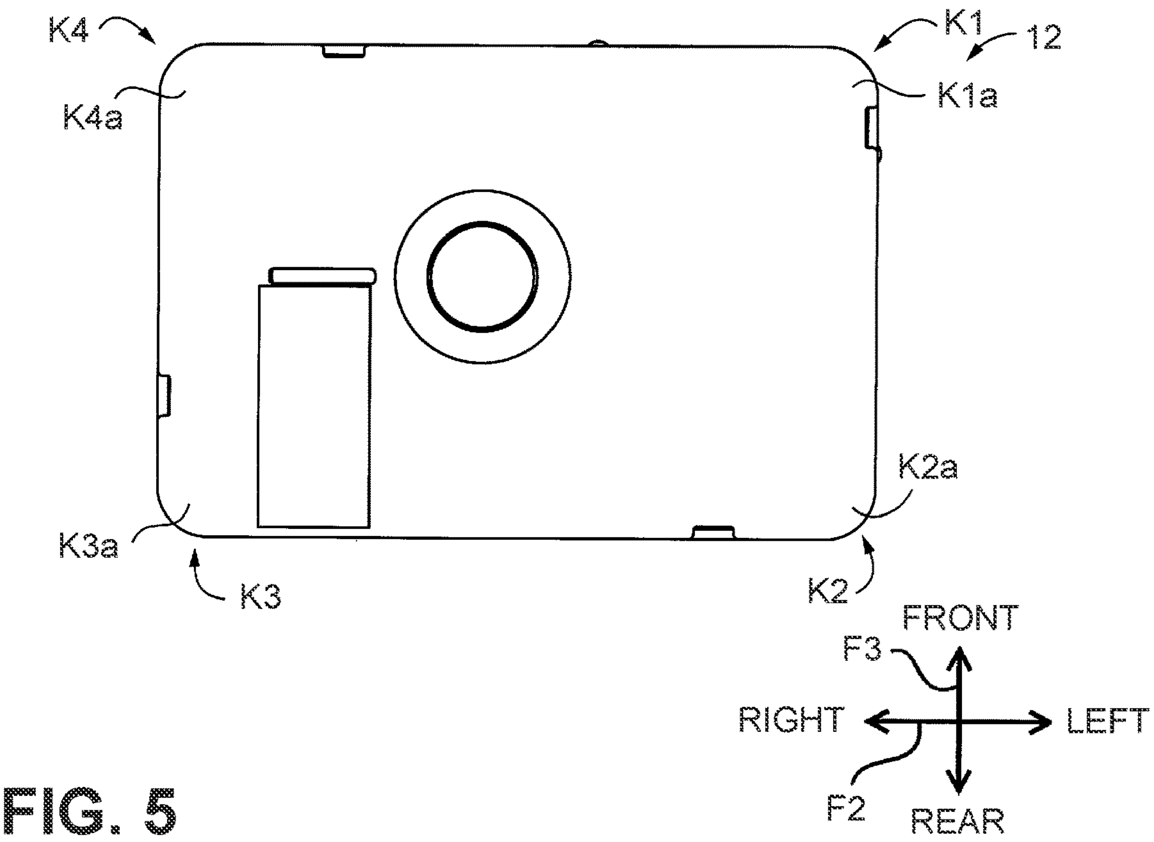
FIG. 4 is a front view illustrating an upper surface side of the first case member of FIG. 1.
Figure 5:
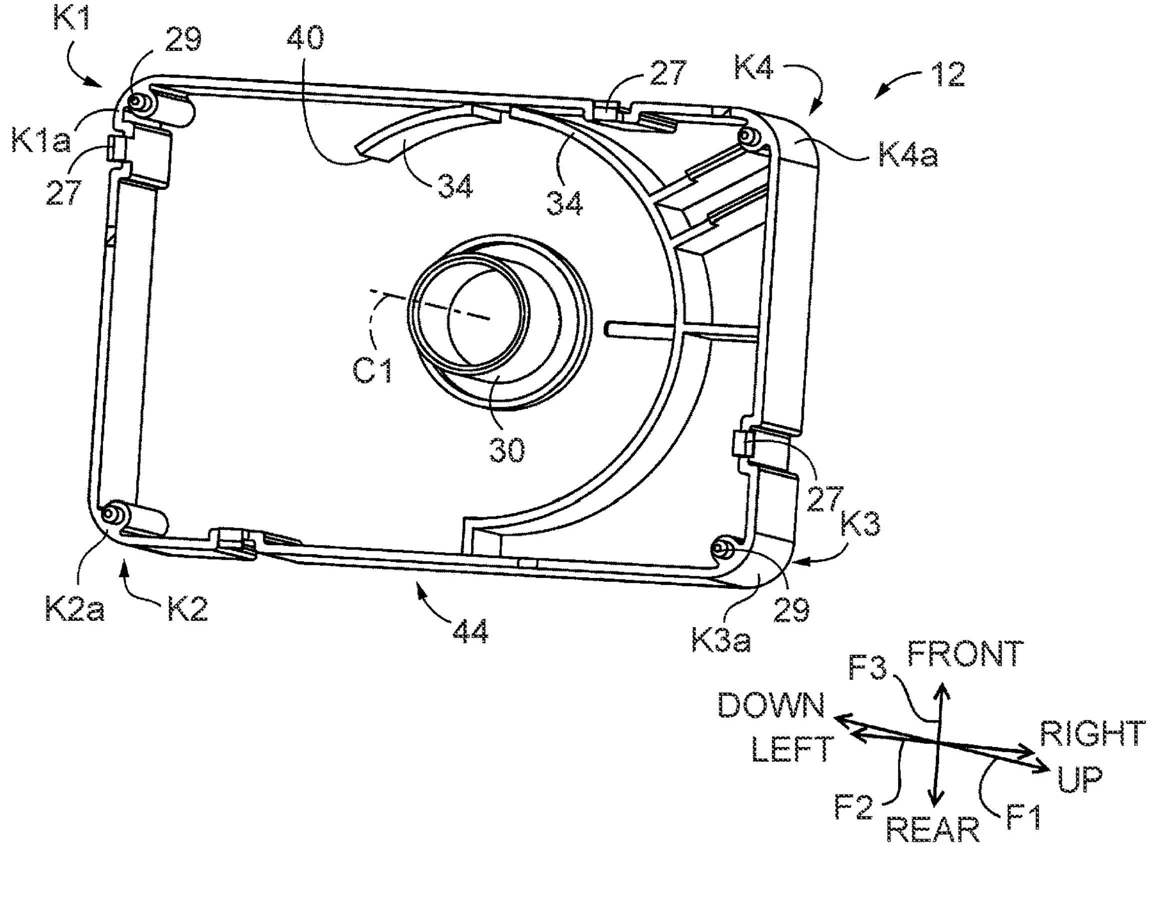
FIG. 5 is a perspective view illustrating a lower surface side of the first case member of FIG. 1.
Figure 6:
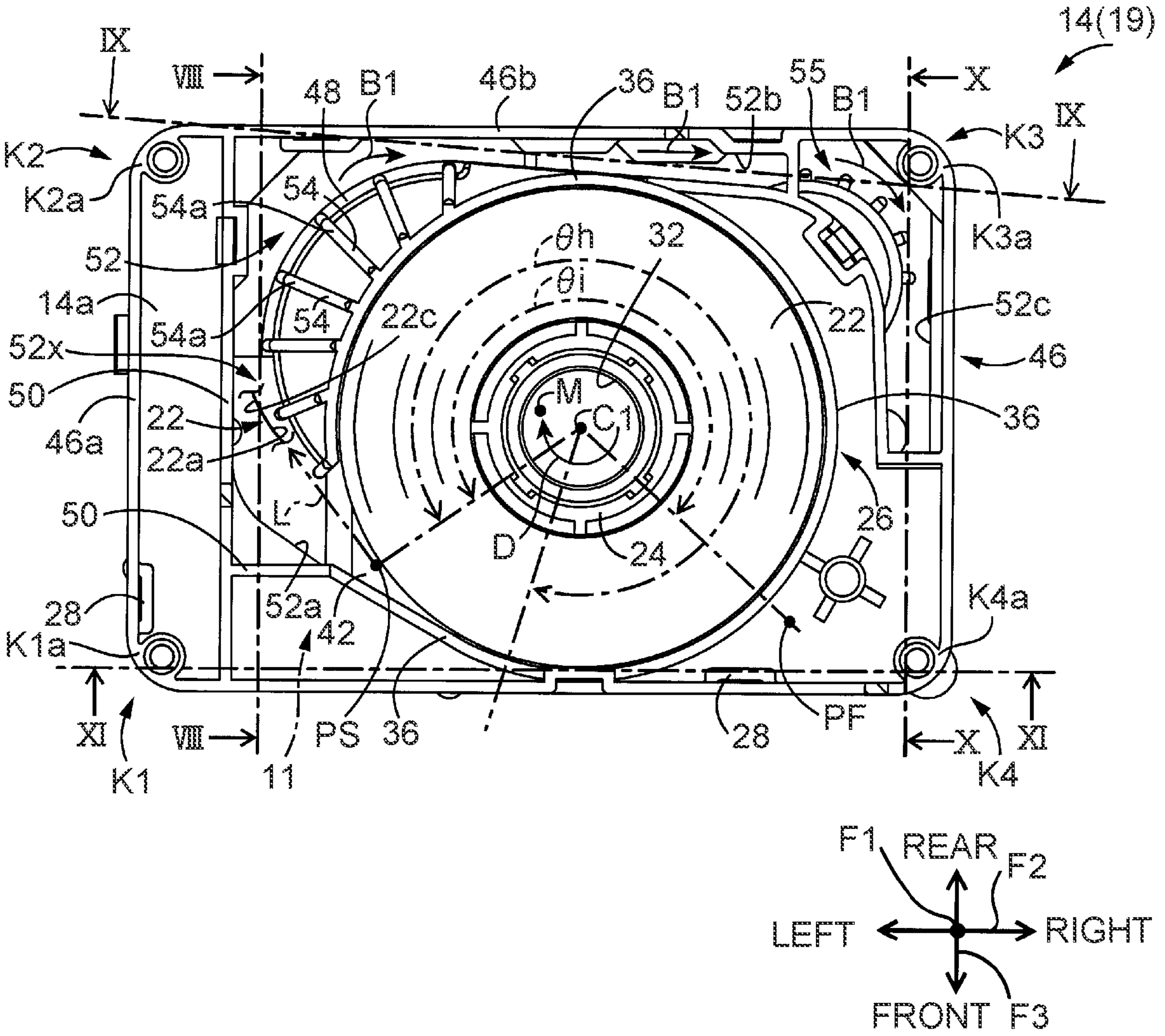
FIG. 6 is a front view illustrating an upper surface side of the second case member of FIG. 1 with a printing tape roll.
Figure 7:
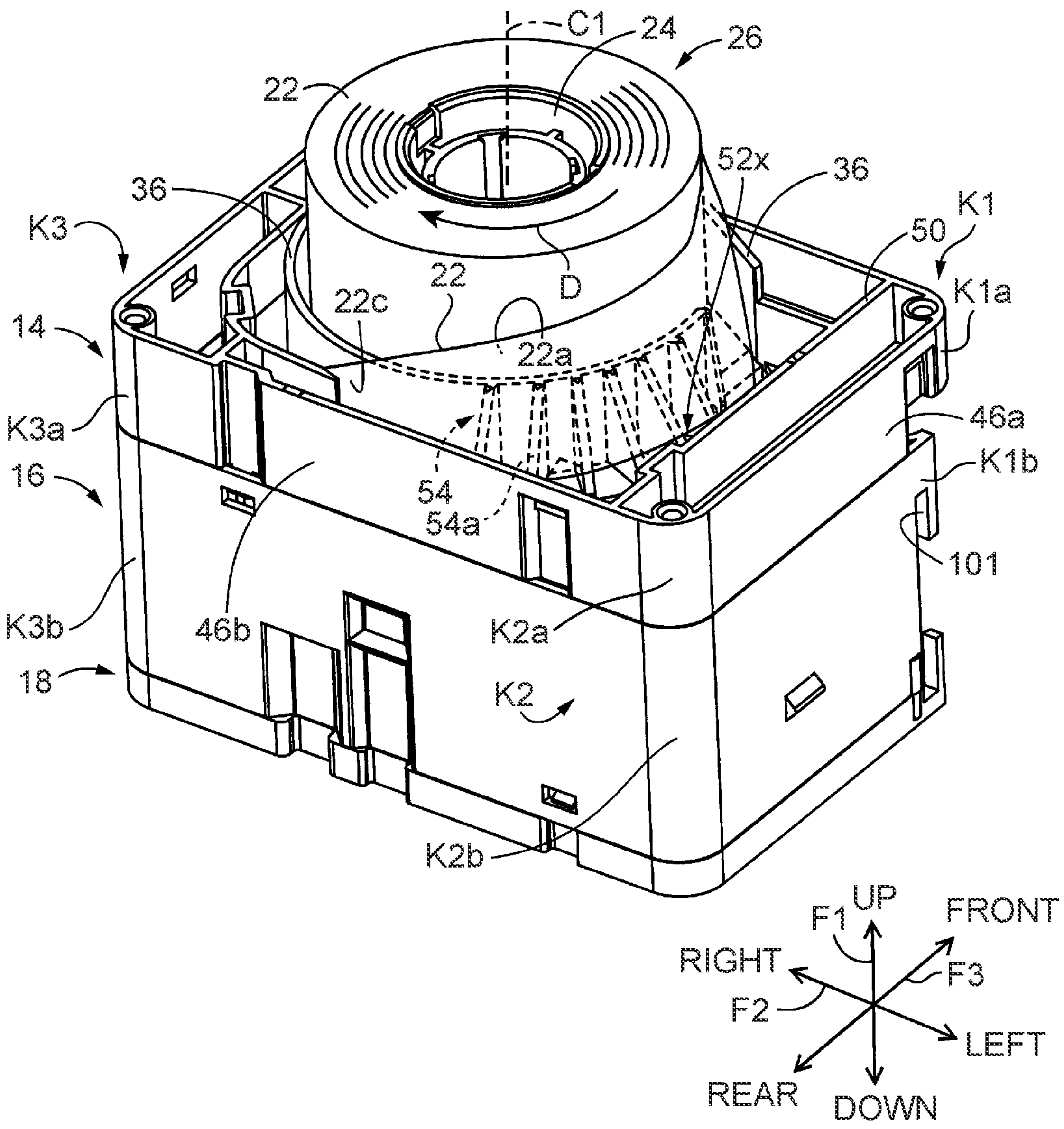
FIG. 7 is a perspective view illustrating the cassette of FIG. 1 with the first case member removed.
Figure 13:
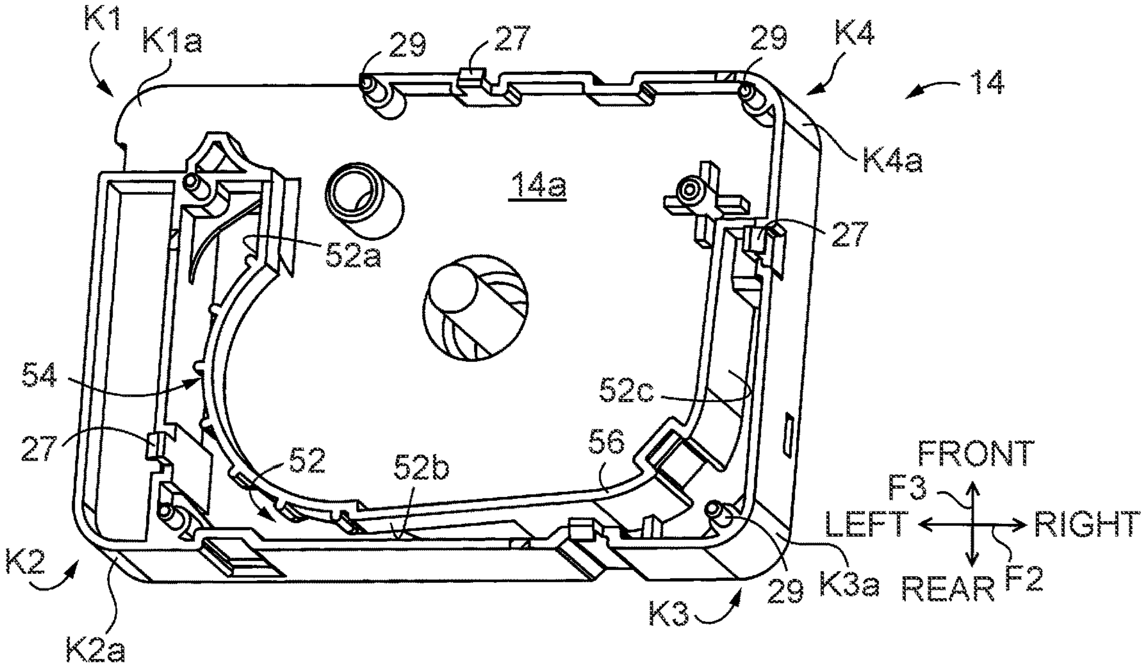
FIG. 13 is a perspective view illustrating a lower surface side of the second case member of FIG. 1.
Figure 14:
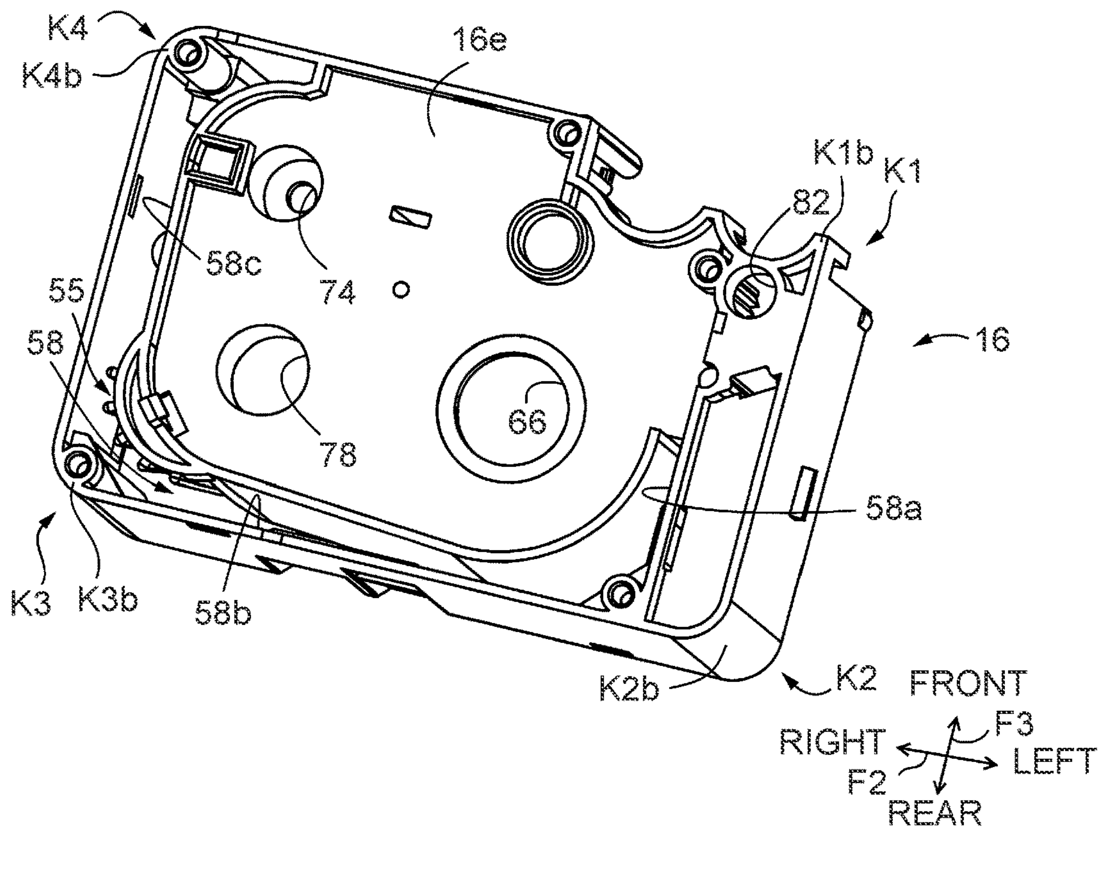
FIG. 14 is a perspective view illustrating an upper surface side of the third case member of FIG. 1.
Figure 15:
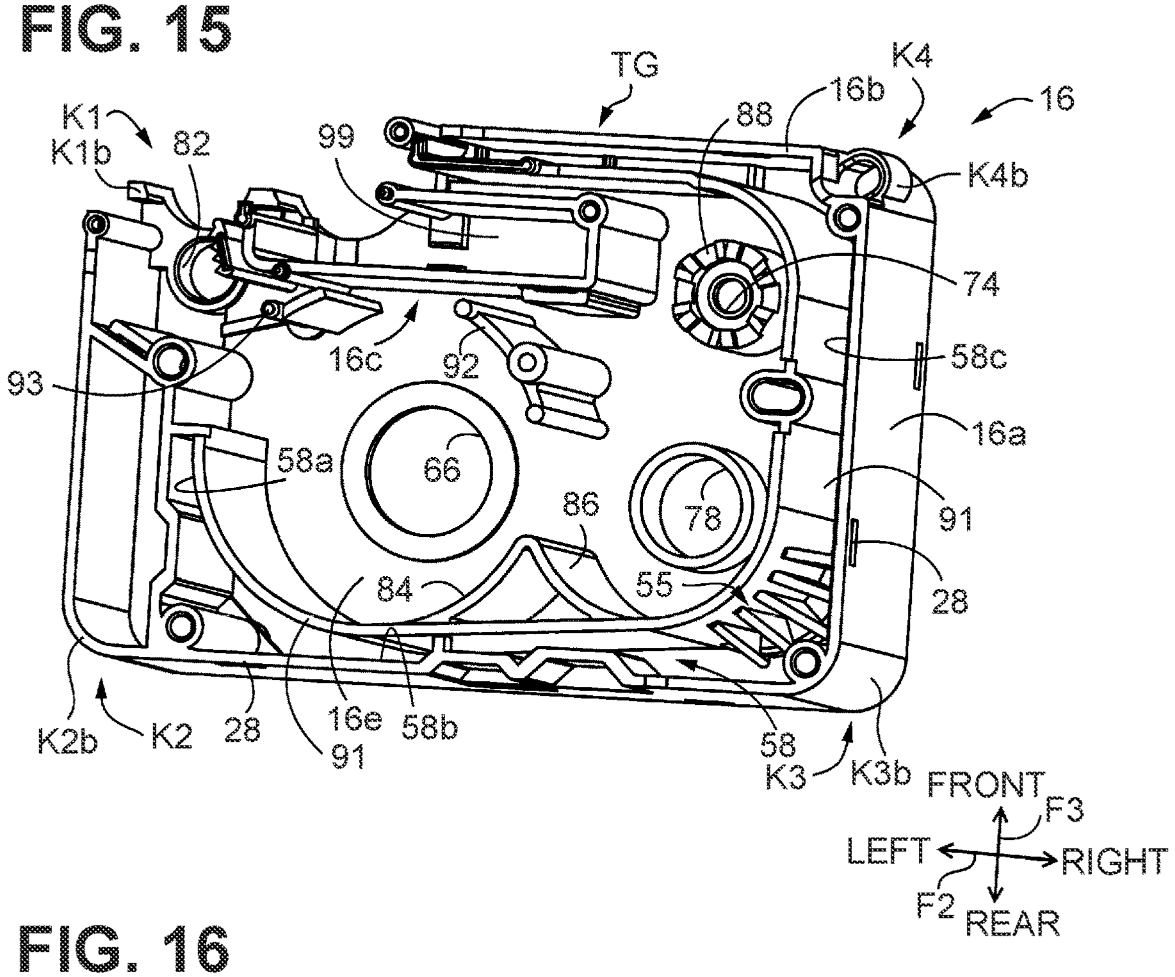
FIG. 15 is a perspective view illustrating a lower surface side of the third case member of FIG. 1.
Figure 16:
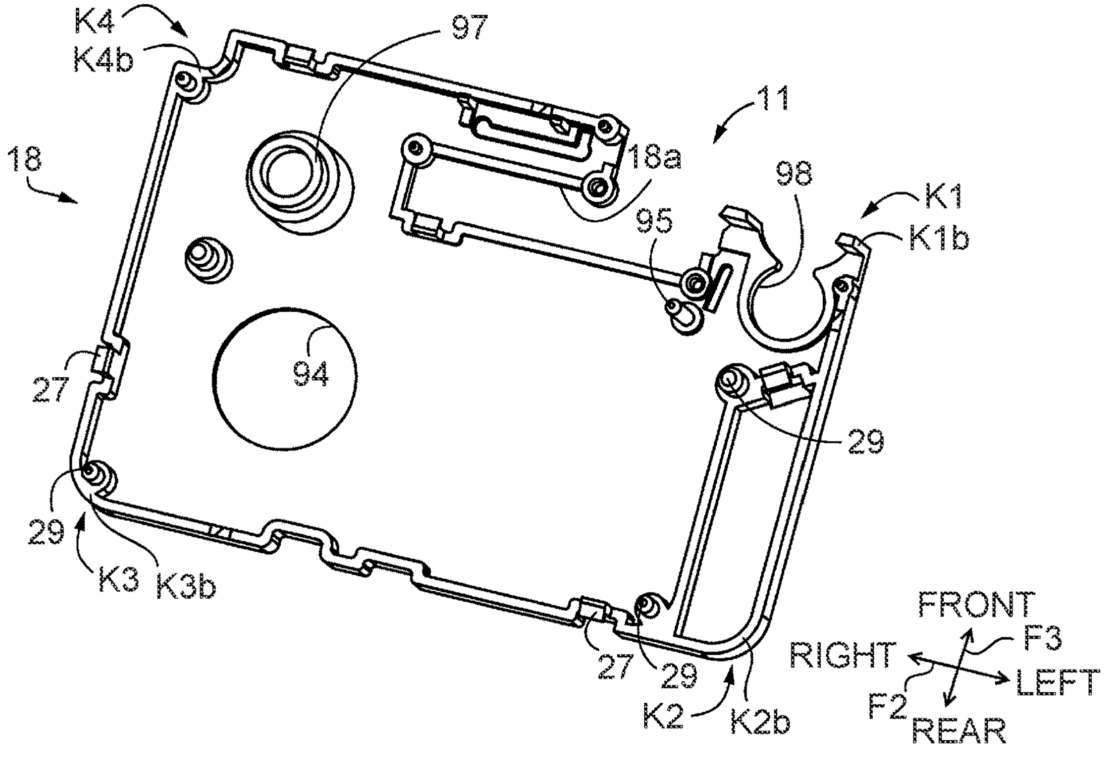
FIG. 16 is a perspective view illustrating an upper surface side of the fourth case member of FIG. 1.
Figure 17:
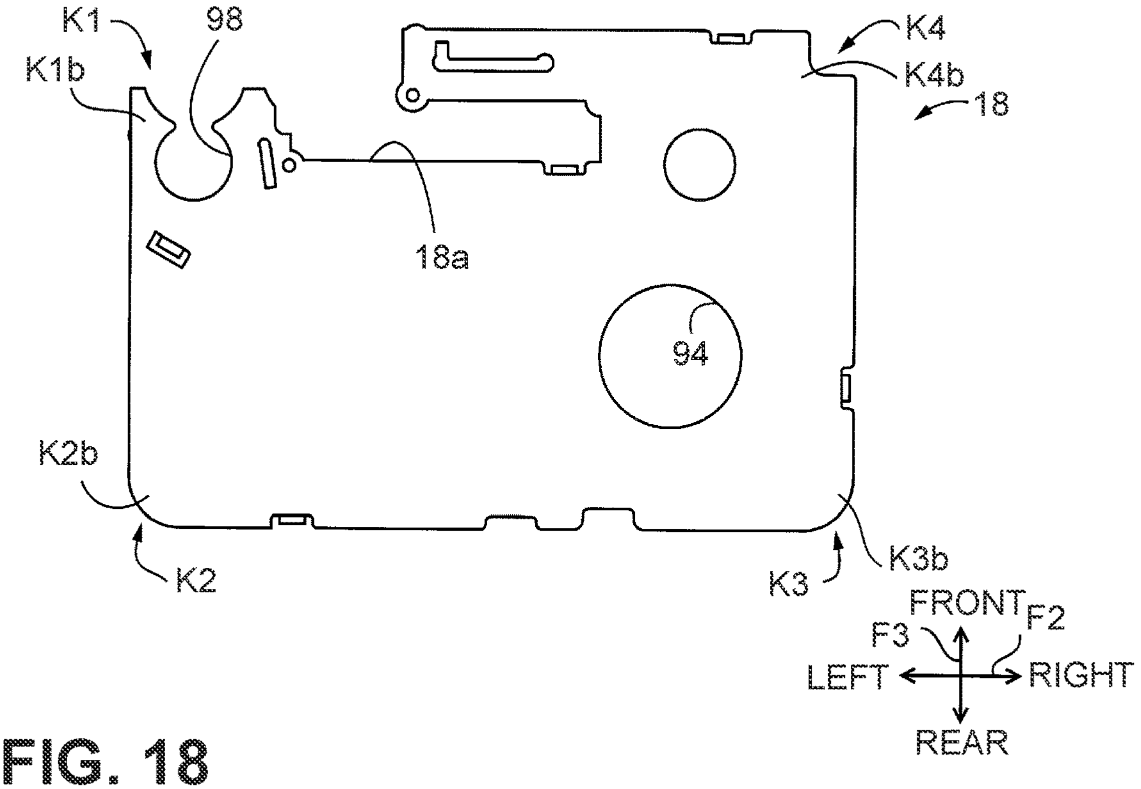
FIG. 17 is a bottom view illustrating a lower surface side of the fourth case member of FIG. 1.

FIG. 4 is a front view illustrating an upper (e.g., obverse) surface side of the first case member 12. FIG. 5 is a perspective view illustrating a lower (e.g., back) surface side of the first case member 12. FIG. 6 is a front view illustrating an upper surface side of the second case member 14 of FIG. 1 and a printing tape roll 26. FIG. 7 is a perspective view illustrating the cassette 10 of FIG. 1 with the first case member 12 removed. FIGS. 8, 9, 10, and 11 are cross sectional views of FIG. 6, illustrating a state where a printing tape (e.g., a medium to be printed) 22 is transported from the inside of the tape case 20 to the inside of the ribbon case 21. FIG. 13 is a perspective view illustrating a lower surface side of the second case member 14. FIG. 14 is a perspective view illustrating an upper surface side of the third case member 16. FIG. 15 is a perspective view illustrating a lower surface side of the third case member 16. FIG. 16 is a perspective view illustrating an upper surface side of the fourth case member 18. FIG. 17 is a bottom view illustrating a lower surface side of the fourth case member 18.

Figure 19:
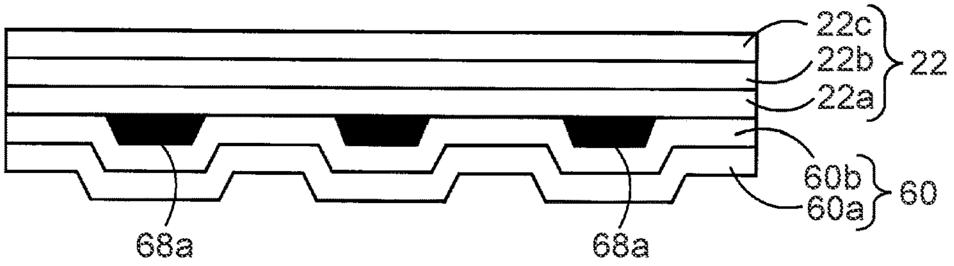
FIG. 19 illustrates a laminate of the printing tape and the laminating tape both discharged from the cassette of FIG. 1.

The first space S1 is defined between the first case member 12 and the second case member 14. The printing tape roll 26 is accommodated in the first space S1 so as to be rotatable about a first rotation axis (e.g., a rotation axis) C1 extending parallel to an up-down direction (e.g., a first direction) F1. In the printing tape roll 26, a printing tape 22 is wound around a printing tape spool 24 that is a cylindrical shaft core member. The first rotation axis C1 is a rotation axis of the printing tape spool 24 as well as a rotation axis of the printing tape roll 26. The up-down direction F1 corresponds to the first direction that is a direction in which the first case member 12 to the fourth case member 18 are stacked. An upward direction refers to a direction toward the first case member 12. A downward direction refers to a direction toward the fourth case member 18. The first case member 12 and the second case member 14 each have a rectangular shape. The first rotation axis C1 is offset to the right from the centers of the first case member 12 and the second case member 14 with respect to a longitudinal direction of the first case member 12 and the second case member 14. The printing tape 22 is a medium to be printed on which printing is to be performed by the print head 106. For example, as illustrated in FIG. 19, the printing tape 22 is a laminate in which a release tape (e.g., a release layer) 22*c* is laid over a surface opposite to a to-be-printed surface of a to-be-printed tape (e.g., a to-be-printed layer) 22*a* as a base via an adhesive 22*b*. That is, the printing tape 22 includes the to-be-printed tape 22*a*, the adhesive 22*b*, and the release tape 22*c*. For example, as illustrated in FIGS. 6 and 7, in the printing tape roll 26, the printing tape 22 is wound around the printing tape spool 24 about the first rotation axis C1 in a winding direction D and is disposed such that the to-be-printed tape 22*a* is on an inner side of the printing tape 22 in the winding direction D and the release tape 22*c* is on an outer side of the printing tape 22 in the winding direction D. The inner side of the printing tape 22 in the winding direction D is a side surface (e.g., the inner side) closer to the printing tape spool 24, that is, the first rotation axis C1, of a pair of side surfaces of the printing tape 22 wound around the printing tape spool 24. The outer side of the printing tape 22 in the winding direction D is a side surface (e.g., the outer side) farther from the printing tape spool 24, that is, the first rotation axis C1, of the pair of side surfaces of the printing tape 22 wound around the printing tape spool 24.

As illustrated in FIGS. 3, 5 and 6, the first case member 12 includes a cylindrical first support projection 30 and a first circumferential wall 34 protruding from a lower surface thereof, and the second case member 14 includes a cylindrical second support projection 32 and a second circumferential wall 36 protruding from an upper surface thereof. The first support projection 30 and the second support projection 32 are coupled to an upper end and the other end, respectively, of the printing tape spool 24 to support the printing tape roll 26 rotatably. The first circumferential wall 34 and the second circumferential wall 36 have an axis that is coaxial with the first rotation axis C1. The first circumferential wall 34 and the second circumferential wall 36 have an inside diameter greater than an outside diameter of the printing tape roll 26 that is yet to be used. In a state where the printing tape roll 26 is held inside the first circumferential wall 34 and the second circumferential wall 36, the printing tape spool 24 is disposed between the first case member 12 and the second case member 14 while a spacer film 38 is disposed between the printing tape spool 24 and each of the first case member 12 and the second case member 14. Each spacer film 38 has a disc-shape having an outside diameter equal to the outside diameter of the printing tape roll 26. The spacer films 38 enable the printing tape roll 26 to rotate smoothly. Each spacer film 38 is made from, for example, a tetrafluoroethylene resin sheet.

As illustrated in FIG. 5, the first case member 12 includes a printing tape gate 40 at its lower surface. The first circumferential wall 34 is partially cut away to define the printing tape gate 40. As illustrated in FIG. 6, the second case member 14 includes a printing tape gate 42 at its upper surface. The second circumferential wall 36 is partially cut away to define the printing tape gate 42. The printing tape gates 40 and 42 allow the printing tape 22 to be drawn from the printing tape roll 26 at a certain position. The second case member 14 includes guide walls 48 and 50 at its upper surface. The guide wall 48 has an arc shape such that its outer surface continuously extends along an inner circumference of a through hole (e.g., a second opening portion) 52 so as to guide the printing tape 22 drawn from the printing tape roll 26 to move in a certain direction. The guide wall 50 extends leftward from a left end of the printing tape gate 42. The guide wall 50 serves as a guide portion that guides the printing tape 22.

As illustrated in FIG. 6, the guide wall 50 of the second case member 14 bends toward a long side portion 46*b* before reaching a short side portion 46*a* of the outer peripheral wall 46, and further extends to the long side portion 46*b* along the second circumferential wall 36.

As illustrated in FIG. 6, a bottom plate (e.g., a lower portion) 14*a* of the second case member 14 has an opening elongated along between the guide wall 50 and the long side portion 46*b* of the outer peripheral wall 46, that is, the through hole 52. The guide wall 48 of the second case member 14 includes a plurality of guide ribs 54 between a particular portion of the second circumferential wall 36 and the through hole 52. The particular portion of the second circumferential wall 36 faces the guide wall 50. Each guide rib 54 has a tapered outer contact surface at its rib end 54*a*. The tapered surfaces that are the outer contact surfaces at the rib ends 54*a* of the respective guide ribs 54 are for guiding, into the through hole 52, the printing tape 22 drawn from the printing tape roll 26 and fed through the printing tape gates 40 and 42. FIG. 7 illustrates the cassette 10 with the first case member 12 removed, wherein the printing tape 22 drawn from the printing tape roll 26 is guided to a second space S2 via the through hole 52. The second space S2 is defined between the third case member 16 and the fourth case member 18. The printing tape 22 thus extends between the tape case 20 and the ribbon case 21 via the through hole 52 defined in the bottom plate 14*a* serving as a partition between the first space S1 and the second space S2. An opening, that is, a through hole (e.g., a first opening portion) 58 is formed in a ceiling plate (e.g., an upper portion) 16*e* of the third case member 16. As illustrated in FIG. 15, the ceiling plate 16*e* of the third case member 16 includes a guide wall 91 having an outer surface continuously extending along an inner circumference of the through hole 58. The laminating tape roll 64 and the ink ribbon roll 72 are disposed inside the guide wall 91.

Figure 8:
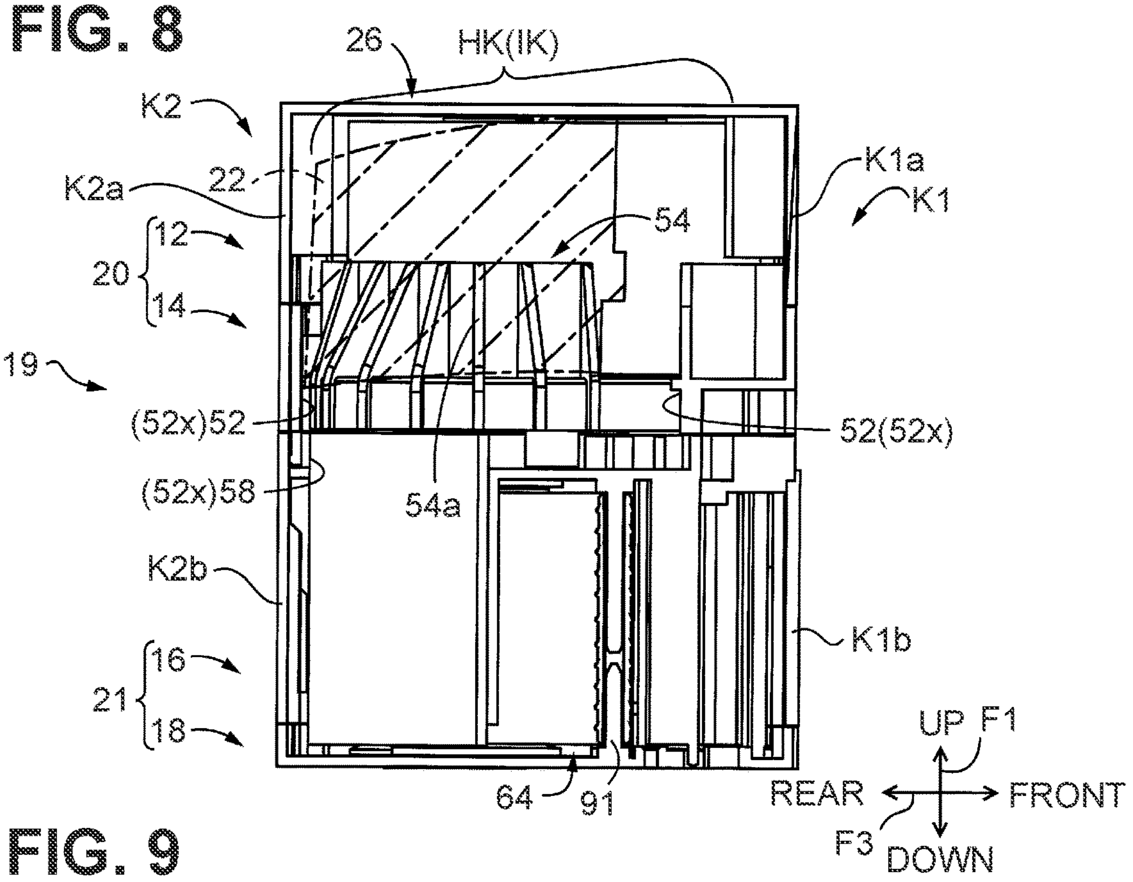
FIG. 8 is a cross sectional view taken along line VIII-VIII in FIG. 6, illustrating a state where a printing tape is drawn from a printing tape roll and transport of the printing tape to a ribbon case is started.
Figure 9:
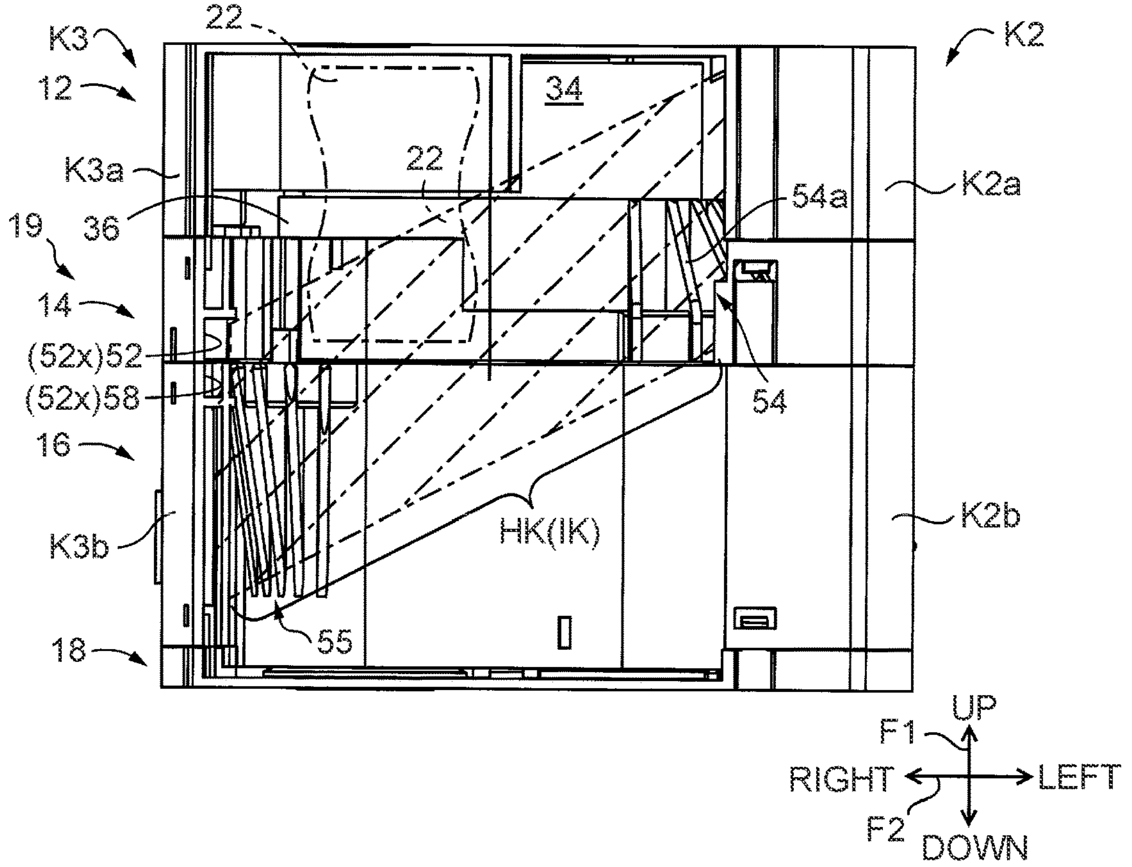
FIG. 9 is a cross sectional view taken along line IX-IX in FIG. 6, illustrating a state where the printing tape extends from the inside of a tape case to the inside of the ribbon case in an inclined manner.
Figure 10:
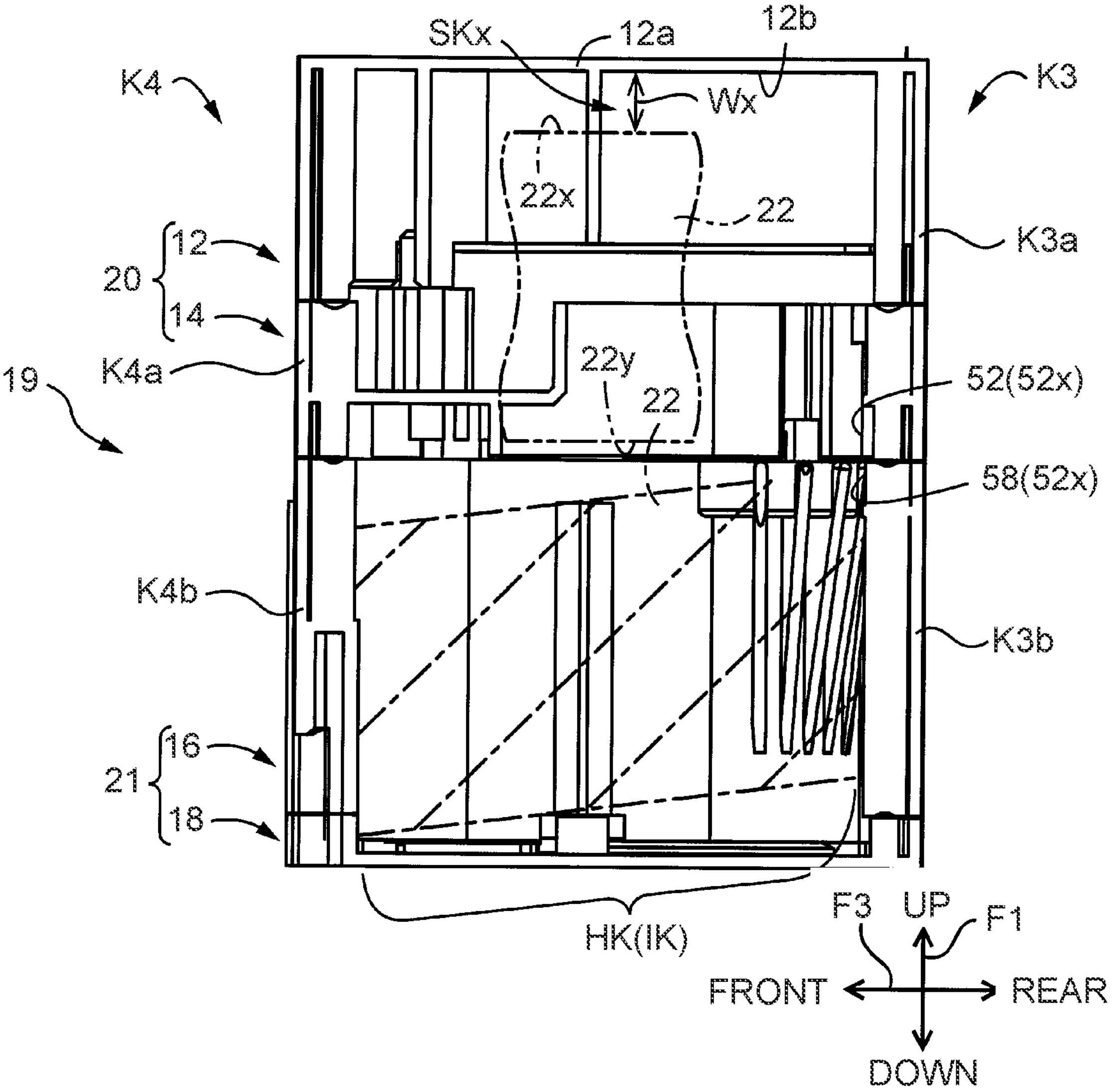
FIG. 10 is a cross sectional view taken along line X-X in FIG. 6, illustrating a state where the transport of the printing tape to the ribbon case has finished.
Figure 11:
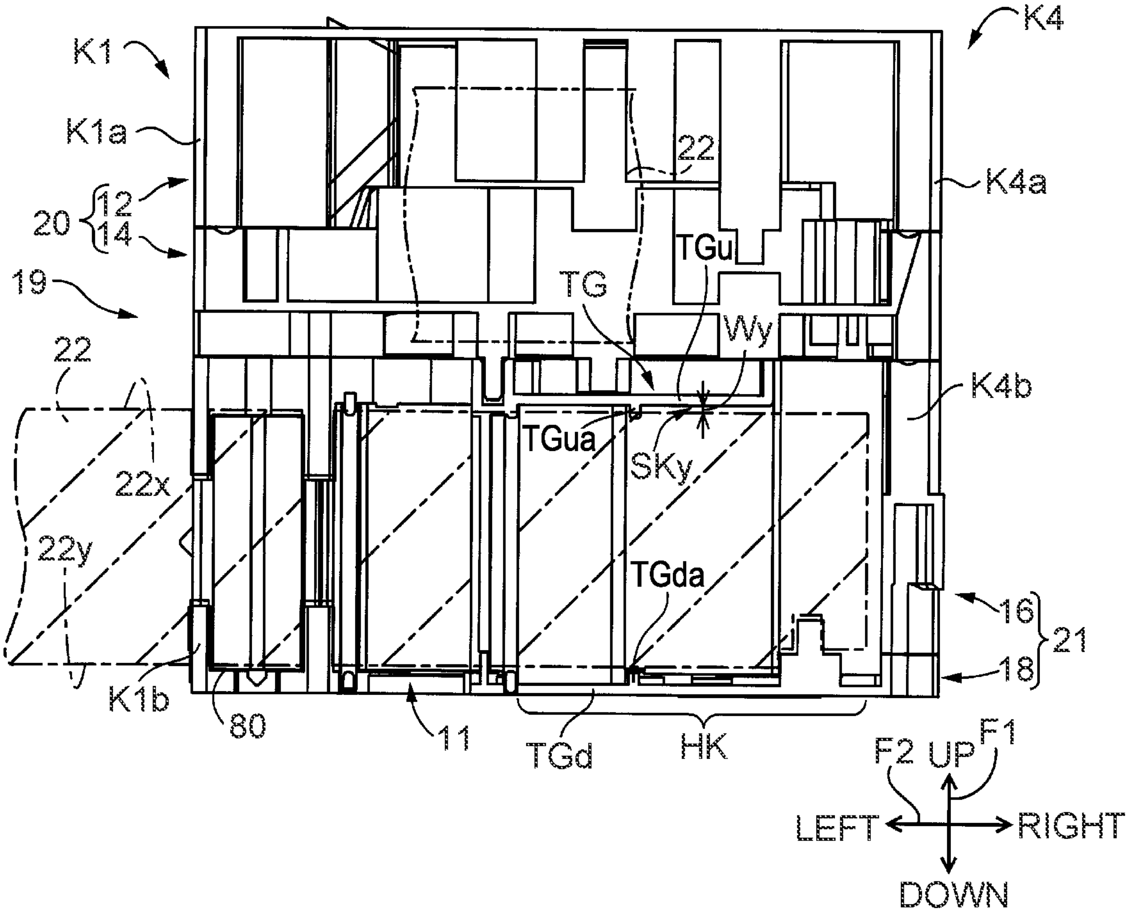
FIG. 11 is a cross sectional view taken along line XI-XI in FIG. 6, illustrating the state where the transport of the printing tape to the ribbon case has finished.

FIGS. 8, 9, 10, and 11 each illustrate a conveyance path HK extending from the printing tape roll 26 in the tape case 20 to the recessed groove 11 where the printing tape 22 is exposed, via the through holes 52 and 58. That is, the case 19 of the cassette 10 has the conveyance path HK for conveying the printing tape 22 from the printing tape roll 26 to the recessed groove 11. FIG. 8 is a cross sectional view taken along line VIII-VIII in FIG. 6, illustrating a state where the printing tape 22 is drawn from the printing tape roll 26 and transport of the printing tape 22 to the ribbon case 21 is started. FIG. 9 is a cross sectional view taken along line IX-IX in FIG. 6, illustrating a state where the printing tape 22 extends from the inside of the tape case 20 to the inside of the ribbon case 21 in an inclined manner. FIG. 10 is a cross sectional view taken along line X-X in FIG. 6, illustrating a state where the transport of the printing tape 22 to the ribbon case 21 has finished. FIG. 11 is a cross sectional view taken along line XI-XI in FIG. 6, illustrating a state where a state of the printing tape 22 extending to the recessed groove 11 where the printing tape 22 is exposed after the transport of the printing tape 22 is finished.

For example, as illustrated in FIG. 6, the case 19, that is, the second case member 14 of the cassette 10 has a rectangular parallelepiped shape in a plan view, that is, when viewed in the up-down direction F1. The case 19 has four corner portions K1, K2, K3, and K4 in this order in the winding direction D of the printing tape roll 26. As illustrated in FIG. 2, the case 19, that is, the ribbon case 21 has the recessed groove 11, into which the print head 106 is inserted, between the corner portions K1 and K4. As illustrated in FIG. 6, a transport start position PS where the printing tape 22 separates from the printing tape roll 26 is a point of contact of the printing tape 22 to a tangent L extending toward the through hole 52. As illustrated in FIGS. 6 and 10, a transport end position PF is where the printing tape 22 is located at the lowest position in the up-down direction F1 and extends parallel to the ink ribbon 68. FIG. 8 illustrates a state where the printing tape 22 is being transported between the corner portion K1 and the corner portion K2. FIG. 9 illustrates a state where the printing tape 22 is being transported between the corner portion K2 and the corner portion K3. FIG. 10 illustrates a state where the printing tape 22 is being transported between the corner portion K3 and the corner portion K4. FIGS. 8, 9, and 10 each illustrate a transport path IK. In the plan view of FIG. 6, the transport path IK corresponds to the transport path IK extending via at least three corner portions, preferably four corner portions, of the corner portions K1 to K4, and is indicated by a transport angle θi about first rotation axis C1 of the printing tape roll 26. The transport angle θi is 180° or larger and smaller than a conveyance angle θh for the conveyance path HK. The conveyance path HK is a path from a position where the printing tape 22 is drawn from the printing tape roll 26, that is, from the transport start position PS, to a position where the printing tape 22 reaches the recessed groove 11. The transport path IK is a path from the transport start position PS to the transport end position PF. In other words, the transport path IK is a path from a position where the printing tape 22 is drawn from the printing tape roll 26 in the tape case 20 to a position where the printing tape 22 reaches the ink ribbon 68 by transport of the printing tape 22 to the ribbon case 21 in the up-down direction F1, that is, to a position where the posture of the printing tape 22 is changed to be parallel to the ink ribbon 68 by transport of the printing tape 22 to the ribbon case 21 in the up-down direction F1, and is a part of the conveyance path HK.

As illustrated in FIGS. 1, 2, and 7, the corner portion K1 includes an upper side corner portion K1*a* formed at the tape case 20 and a lower side corner portion K1*b* formed at the ribbon case 21. The corner portion K2 includes an upper side corner portion K2*a* formed at the tape case 20 and a lower side corner portion K2*b* formed at the ribbon case 21. The corner portion K3 includes an upper side corner portion K3*a* formed at the tape case 20 and a lower side corner portion K3*b* formed at the ribbon case 21. The corner portion K4 includes an upper side corner portion K4*a* formed at the tape case 20 and a lower side corner portion K4*b* formed at the ribbon case 21.

As illustrated in FIG. 6, the through hole 52 defined in the bottom plate 14*a* of the second case member 14 includes a first hole section 52*a*, a second hole section 52*b*, and a third hole section 52*c*. The first hole section 52*a* extends from the upper side corner portion K1*a* of the corner portion K1 toward the upper side corner portion K2*a* of the corner portion K2. The second hole section 52*b* extends from the upper side corner portion K2*a* of the corner portion K2 toward the upper side corner portion K3*a* of the third corner portion K3. The third hole section 52*c* extends from the upper side corner portion K3*a* of the third corner portion K3 toward the upper side corner portion K4*a* of the corner portion K4. As illustrated in FIG. 6, the through hole 52 is defined such that the printing tape 22 drawn from the printing tape roll 26 is conveyed in the up-down direction F1 from the first hole section 52*a* toward the third hole section 52*c* via the second hole section 52*b* in the through hole 52 along the conveyance path HK. That is, the through hole 52 is defined such that the printing tape 22 drawn from the printing tape roll 26 is conveyed in the through hole 52 in the up-down direction F1 via the corner portion K1, the corner portion K2, and the corner portion K3 in this order along the conveyance path HK. As illustrated in FIG. 6, the second hole section 52*b* of the through hole 52 is located opposite to the recessed groove 11 with respect to a center position M of the cassette 10 in a front-rear direction (e.g., a third direction) F3 (refer to FIG. 1) orthogonal to the up-down direction F1 (refer to FIG. 1) and the right-left direction (e.g., a second direction) F2 (refer to FIG. 1) in which the printing tape 22 is conveyed in the recessed groove 11. In FIG. 1, an upper side and lower side of FIG. 1 refer to a front side and rear side of the cassette 10, respectively. In FIG. 1, a right side and left side of FIG. 1 refer to a left side and right side of the cassette 10, respectively. In FIG. 1, an upper left side and lower right side of FIG. 1 refer to an upper side and lower side of the cassette 10, respectively.

Figure 20:
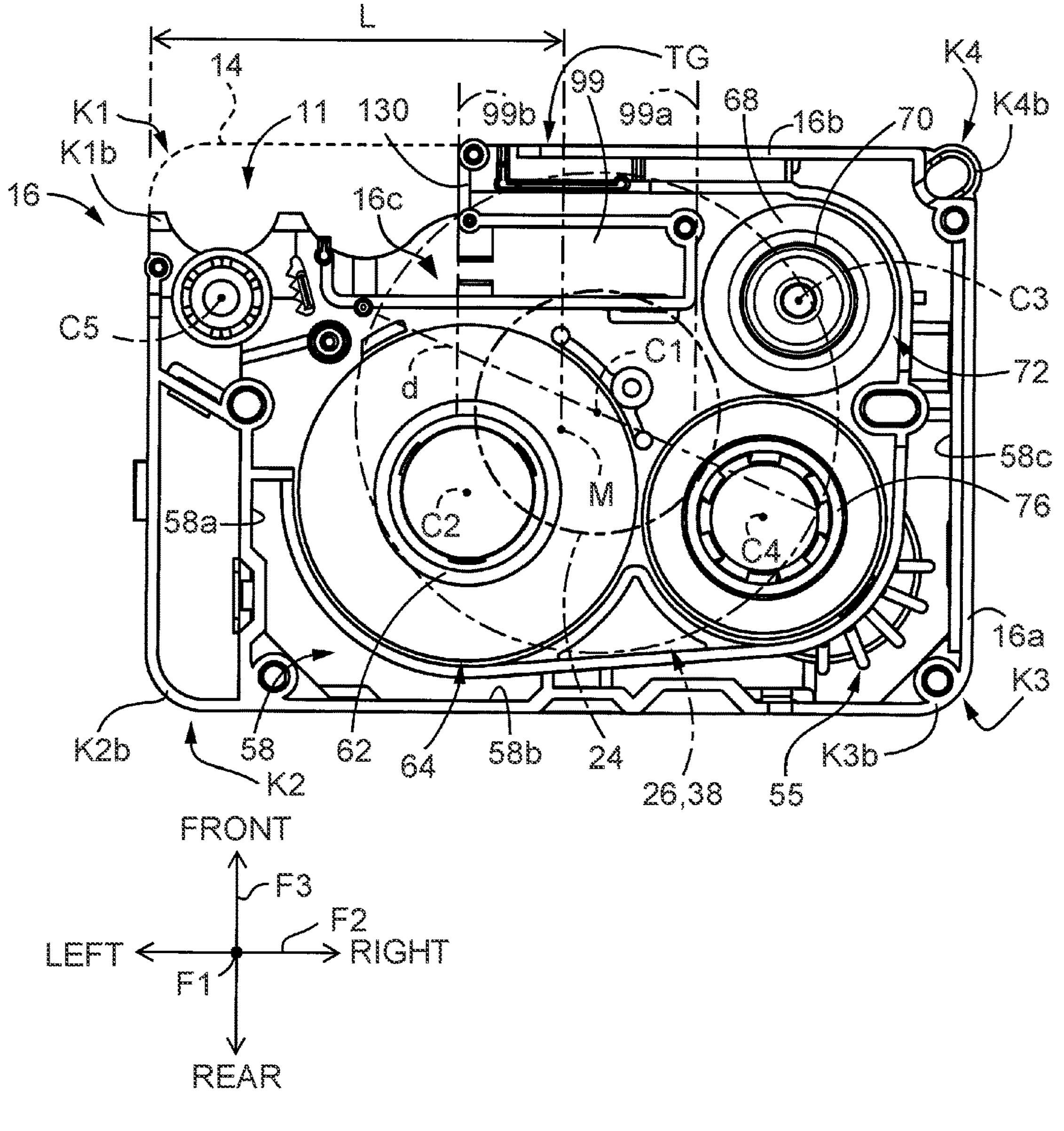
FIG. 20 is a plan view of the cassette of FIG. 1, illustrating relative positions of the printing tape roll, the laminating tape roll, the ink ribbon roll, and the take-up spool.

As illustrated in FIGS. 14 and 15, the through hole 58 defined in the ceiling plate 16*e* of the third case member 16 includes a first hole section 58*a*, a second hole section 58*b*, and a third hole section 58*c*. The first hole section 58*a* extends from the lower side corner portion K1*b* of the corner portion K1 toward the lower side corner portion K2*b* of the corner portion K2. The second hole section 58*b* extends from the lower side corner portion K2*b* of the corner portion K2 toward the lower side corner portion K3*b* of the third corner portion K3. The third hole section 58*c* extends from the lower side corner portion K3*b* of the third corner portion K3 toward the lower side corner portion K4*b* of the corner portion K4. The through hole 58 is defined such that the printing tape 22 drawn from the printing tape roll 26 is conveyed in the up-down direction F1 from the first hole section 58*a* toward the third hole section 58*c* via the second hole section 58*b* in the through hole 58 along the conveyance path HK. That is, the through hole 58 is defined such that the printing tape 22 drawn from the printing tape roll 26 is conveyed in the through hole 52 in the up-down direction F1 via the corner portion K2, the corner portion K3, and the corner portion K4 in this order along the conveyance path HK. As illustrated in FIG. 20, the second hole section 58*b* of the through hole 58 is located opposite to the recessed groove 11 with respect to the center position M of the cassette 10 in the front-rear direction F3.

As illustrated in FIG. 6, the transport start position PS of the conveyance path HK and the transport path 1K are located on the same side as the side on which the recessed groove 11 is provided with respect to the center position M of the cassette 10 in the right-left direction F2 and in the front-rear direction F3. The right-left direction F2 is a direction in which the printing tape 22 is conveyed in the recessed groove 11. The front-rear direction F3 is a thickness direction of the printing tape 22 in the recessed groove 11. The transport end position PF of the transport path IK is located on the side opposite to the side on which the recessed groove 11 is provided in the ribbon case 21 with respect to the center position M of the cassette 10 in the right-left direction F2 and on the same side as the side on which the recessed groove 11 is provided in the ribbon case 21 with respect to the center position M of the cassette 10 in the front-rear direction F3. The right-left direction F2 is the direction in which the printing tape 22 is conveyed in the recessed groove 11. The front-rear direction F3 is the thickness width direction of the printing tape 22 in the recessed groove 11.

Figure 12:
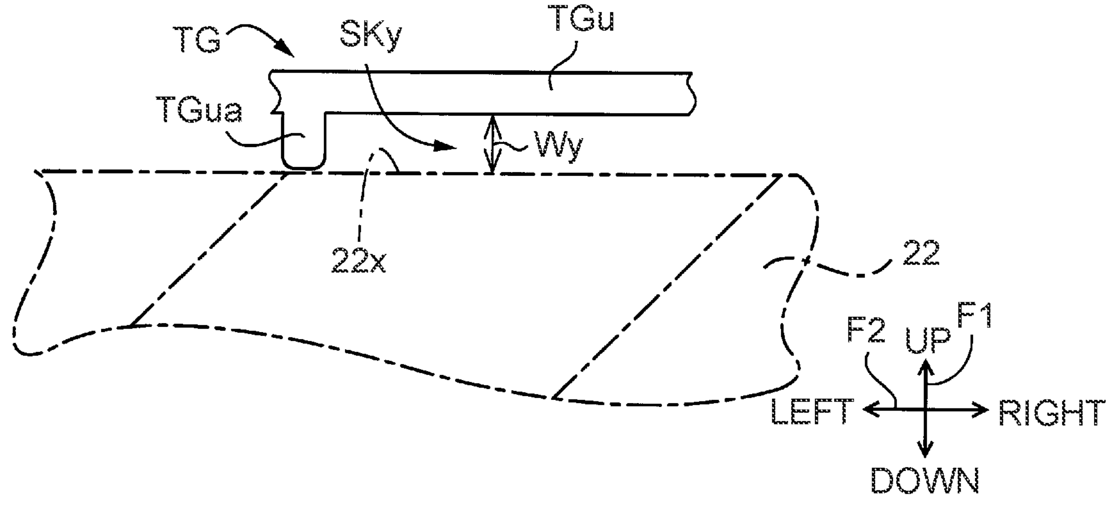
FIG. 12 is an enlarged view of surroundings of a ceiling wall portion of a printing tape guide of FIG. 11.

As illustrated in FIG. 8, the conveyance path HK is defined such that the printing tape 22 drawn from the printing tape roll 26 extends between the upper side corner portion K1*a* of the corner portion K1 and the upper side corner portion (e.g., a first corner portion) K2*a* of the corner portion K2 in an inclined manner relative to the printing tape 22 wound into the printing tape roll 26. As illustrated in FIG. 9, the conveyance path HK is defined such that the printing tape 22 extends between the upper side corner portion K2*a* of the corner portion K2 and both of a portion of the upper side corner portion (e.g., a second corner portion) K3*a* of the corner portion K3 and a portion of the lower side corner portion (e.g., the second corner portion) K3*b* of the corner portion K3 in an inclined manner relative to the printing tape 22 wound into the printing tape roll 26. As illustrated in FIG. 10, the conveyance path HK is defined such that the printing tape 22 extends between the lower side corner portion K3*b* of the corner portion K3 and the lower side corner portion (e.g., a third corner portion) K4*b* of the corner portion K4 in an inclined manner relative to the printing tape 22 wound into the printing tape roll 26. As illustrated in FIG. 11, the conveyance path HK is defined such that the printing tape 22 extends between the lower side corner portion K4*b* of the corner portion K4 and the recessed groove 11 horizontally (e.g., parallel) to the printing tape 22 wound into the printing tape roll 26. That is, as illustrated in FIGS. 8 to 11, the conveyance path HK is defined such that the printing tape 22 is conveyed via the upper side corner portion K2*a* of the corner portion K2, the both of the portion of the upper side corner portion K3*a* of the corner portion K3 and the portion of the lower side corner portion K3*b* of the corner portion K3, and the lower side corner portion K4*b* of the corner portion K4 in this order, whereby the printing tape 22 moves from the first space S1 of the tape case 20 to the second space S2 of the ribbon case 21 to reach the recessed groove 11. A double-dotted-and-dashed line indicated in FIGS. 9, 10, and 11 is a virtual line indicating the printing tape 22 wound into the printing tape roll 26. As illustrated in FIG. 9, the ribbon case 21 includes a guide 55. The guide 55 guides the printing tape 22 so that the printing tape 22 extending in an inclined manner relative to the printing tape 22 wound into the printing tape roll 26 is brought to extend horizontally (e.g., parallel) to the printing tape 22 wound into the printing tape roll 26, that is, parallel to the ink ribbon 68. The conveyance path HK is defined such that the printing tape 22 drawn from the printing tape roll 26 is conveyed from the first space S1 of the tape case 20 where the printing tape roll 26 is disposed to the second space S2 of the ribbon case 21 having the recessed groove 11, through an opening 52*x*, that is, through the through hole 52 defined in the bottom plate 14*a* of the second case member 14 and the through hole 58 defined in the ceiling plate 16*e* of the third case member 16. The opening 52*x* is defined at a boundary between the tape case 20 and the ribbon case 21 in the case 19. The opening 52*x* defined at the boundary between the tape case 20 and the ribbon case 21 in the case 19 is a combined space of a space of the through hole 52 and a space of the through hole 58 that are connected to each other at the boundary where the bottom plate 14*a* of the second case member 14 and the ceiling plate 16*e* of the third case member 16 are connected to each other. A spacing Wx illustrated in FIG. 10 is greater than a spacing Wy illustrated in FIGS. 11 and 12. As illustrated in FIG. 10, the spacing Wx is a spacing of a gap SKx in the up-down direction F1 between an upper edge 22*x* of the printing tape 22 and a bottom surface 12*b* of the ceiling plate 12*a* of the first case member 12 above the opening 52*x* defined across the second case member 14 and the third case member 16, that is, above the through holes 52 and 58. As illustrated in FIGS. 11 and 12, the spacing Wy is a spacing of a gap SKy in the up-down direction F1 between the upper edge 22*x* of the printing tape 22 guided by a printing tape guide (e.g., a guide) TG and a ceiling wall portion TGu of the printing tape guide TG. FIG. 12 is an enlarged view of surroundings of the ceiling wall portion TGu of the printing tape guide TG of FIG. 11. An appropriate gap may be thus left between the printing tape 22 and the case 19 for a phenomenon that the width of the printing tape 22 virtually increases in the up-down direction F1 while the printing tape 22 is conveyed in an inclined manner. The same relationship exists in the right-left direction F2 and the front-rear direction F3. The printing tape guide TG is formed in the ribbon case 21. The printing tape guide TG includes the ceiling wall portion TGu facing the upper edge 22*x* of the printing tape 22, and a bottom wall portion TGd facing a lower edge 22*y* of the printing tape 22. The printing tape 22 guided by the printing tape guide TG is restricted in its movement in the up-down direction F1 by a projection TGua of the ceiling wall portion TGu and a projection TGda of the bottom wall portion TGd.

FIG. 13 illustrates a lower (e.g., back) surface of the bottom plate 14*a* of the second case member 14. As illustrated in FIG. 13, the through hole 52 penetrates the bottom plate 14*a* of the second case member 14. A guide wall 56 stands on ta back surface of the bottom plate 14*a* of the second case member 14 and continuously extends along the through hole 52. FIG. 14 illustrates the upper surface side of the third case member 16. The third case member 16 has the through hole 58, a laminating tape roll support hole 66, an ink ribbon support hole 74, a take-up spool support hole 78, and a roller support hole 82 defined in the ceiling plate 16*e* thereof. The through hole 58 is defined at a position corresponding to the through hole 52 of the second case member 14 to route the printing tape 22 to the second space S2.

The bottom plate 14*a* of the second case member 14 and the ceiling plate 16*e* of the third case member 16 corresponds to a plate member that separates the first space S1 of the tape case 20 and the second space S2 of the ribbon case 21 from each other.

The laminating tape roll 64 is supported by the laminating tape roll support hole 66 so as to be rotatable about a second rotation axis C2 while one end of a laminating tape spool 62 around which the laminating tape 60 is wound is engaged in the laminating tape roll support hole 66. The second rotation axis C2 is parallel to the first rotation axis C1. The second rotation axis C2 is a rotation axis of the laminating tape spool 62 as well as a rotation axis of the laminating tape roll 64. As illustrated in FIG. 19, the laminating tape 60 includes a transparent film 60*a* with an adhesive 60*b* applied to, for example, an outer surface of the transparent film 60*a* entirely. The laminating tape 60 is used for protecting a printed surface of the printing tape 22. The ink ribbon roll 72 is supported by the ink ribbon support hole 74 so as to be rotatable about a third rotation axis (e.g., a feed axis) C3 while one end of a feed spool 70 around which the ink ribbon 68 is wound is engaged in the ink ribbon support hole 74. The third rotation axis C3 is parallel to the first rotation axis C1. The third rotation axis C3 is a rotation axis of the feed spool 70 as well as a rotation axis of the ink ribbon roll 72. The take-up spool 76 is supported by the take-up spool support hole 78 so as to be rotatable about a fourth rotation axis C4 while one end of the take-up spool 76 is engaged in the take-up spool support hole 78. The take-up spool 76 takes up the ink ribbon 68 drawn from the ink ribbon roll 72. The fourth rotation axis C4 is parallel to the first rotation axis C1. The fourth rotation axis C4 is a rotation axis of the take-up spool 76. A roller 80 is supported by the roller support hole 82 so as to be rotatable about a fifth rotation axis C5 while one end of the roller 80 is engaged in the roller support hole 82. The roller 80 and a roller of the printing device 102 nip the printing tape 22 and the laminating tape 60 therebetween to press and adhere a printed surface of the printing tape 22 and an adhesive surface of the laminating tape 60 to each other. The fifth rotation axis C5 is parallel to the first rotation axis C1.

FIG. 15 illustrates the lower surface side of the third case member 16. The third case member 16 includes a laminating tape roll holding wall 84, an ink ribbon roll holding wall 86, and a cylindrical projection 88 at its lower surface. The laminating tape roll holding wall 84 has an arc shape. The laminating tape roll holding wall 84 is disposed around the laminating tape roll support hole 66 concentrically about the center of the laminating tape roll support hole 66 to hold the laminating tape roll 64. The ink ribbon roll holding wall 86 is disposed around the take-up spool support hole 78 concentrically about the center of the take-up spool support hole 78 and is contiguous with the laminating tape roll holding wall 84 to hold the ink ribbon roll 72 of the ink ribbon 68 taken up by the take-up spool 76. The cylindrical projection 88 protrudes from the periphery of the ink ribbon support hole 74. The cylindrical projection 88 has, at its distal end, ridges and grooves arranged in a circumferential direction of the cylindrical projection 88.

As illustrated in FIG. 3, a clutch spring holder 90 accommodating a clutch spring is engaged with the other end of the feed spool 70 around which the ink ribbon 68 is wound. The clutch spring accommodated in the clutch spring holder 90 is configured to, in an assembled state, urge the feed spool 70 toward the cylindrical projection 88 to apply an appropriate rotational resistance to the ink ribbon roll 72.

As illustrated in FIG. 15, the third case member 16 includes, at its lower surface, the guide wall 91 whose outer surface continuously extending along the inner circumference of the through hole 58. The laminating tape roll 64 and the ink ribbon roll 72 are disposed inside the guide wall 91. The third case member 16 includes an arc-shaped member 92 at its lower surface. The arc-shaped member 92 is disposed around the laminating tape roll support hole 66 concentrically about the center of the laminating tape roll support hole 66 to define an install position of the laminating tape roll 64.

FIG. 16 illustrates an upper surface of the fourth case member 18. FIG. 17 illustrates a lower surface of the fourth case member 18. As illustrated in FIGS. 16 and 17, the fourth case member 18 has a take-up spool support hole 94 penetrating therethrough. The take-up spool 76 is rotatably supported by the take-up spool support hole 94 while the other end portion of the take-up spool 76 is engaged in the take-up spool support hole 94. The fourth case member 18 includes a cylindrical support projection 97. The support projection 97 is coupled to the other end of the feed spool 70 to support the feed spool 70 rotatably. As illustrated in FIG. 2, the coupling hole 96 formed at the other end of the take-up spool 76 is exposed from the lower surface of the fourth case member 18 through the take-up spool support hole 94. Thus, when the cassette 10 is mounted on the printing device 102, the take-up spool drive shaft 108 of the printing device 102 is inserted into and coupled to the coupling hole 96 so as not to be relatively rotatable. In such a state, the take-up spool 76 is rotationally driven by the take-up spool drive shaft 108.

As illustrated in FIGS. 16 and 17, the fourth case member 18 has a roller exposure hole 98 at a position corresponding to the roller support hole 82 of the third case member 16. The roller exposure hole 98 allows a shaft end of the roller 80 to be exposed. As illustrated in FIG. 2, a coupling portion 80*a* formed at an end of the roller 80 on the fourth case member 18 side is exposed from the lower surface of the fourth case member 18 through the roller exposure hole 98. Thus, when the cassette 10 is mounted on the printing device 102, a roller drive shaft 110 of the printing device 102 is coupled to the coupling portion 80*a* so as not to be relatively rotatable. In such a state, the roller 80 is rotationally driven by the roller drive shaft 110.

Figure 21:
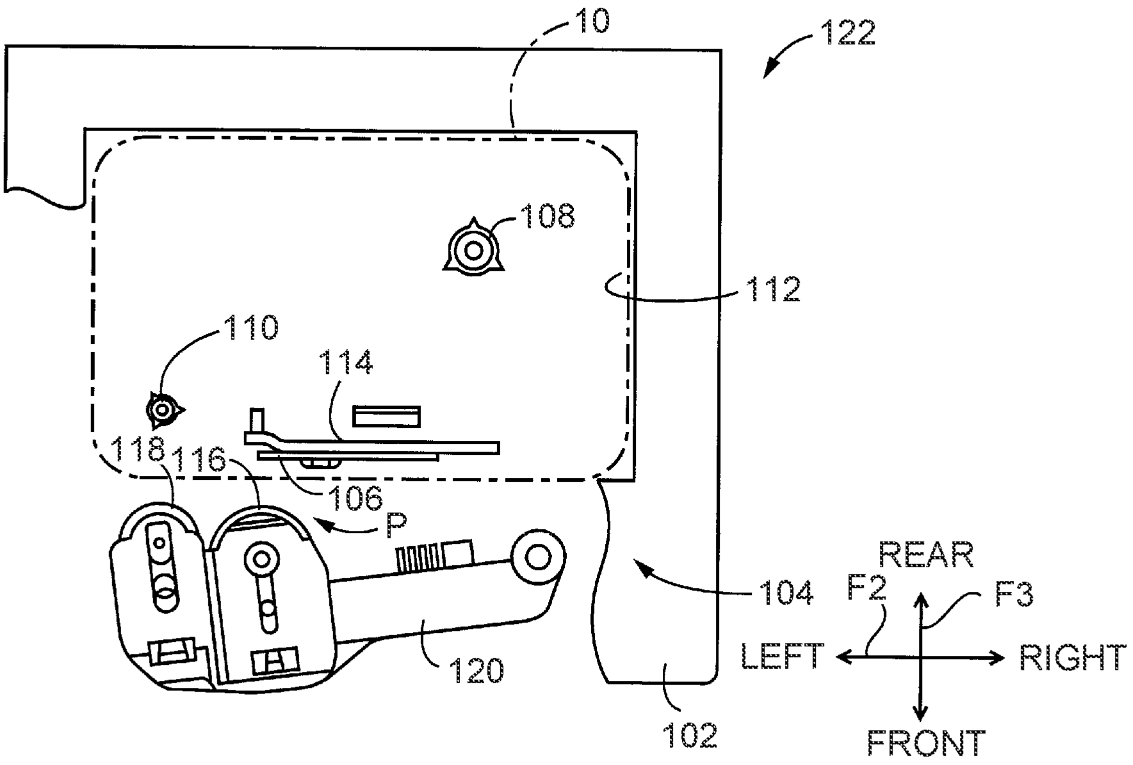
FIG. 21 illustrates a cassette mounting portion of a printing device on which the cassette of FIG. 1 is to be mounted.

As illustrated in FIGS. 2, 15, and 16, the ribbon case 21 composed of the third case member 16 and the fourth case member 18 has a recess 99 for accommodating a head holding plate 114 when the cassette 10 is mounted on the cassette mounting portion 104 illustrated in FIG. 21. The head holding plate 114 stands at the cassette mounting portion 104 and holds the print head 106. As shown in FIG. 2, the recessed groove (e.g., the head space) 11 defined in the ribbon case 21 and the recess 99 defined in the ribbon case 21 are in communication with each other. As shown in FIG. 15, the outer peripheral wall of the third case member 16 includes a first sidewall 16*a*, a second sidewall (e.g., an arm wall) 16*b*, and a U-shaped recess wall 16*c* as a portion thereof. The first sidewall 16*a* extends in the front-rear direction F3. The second sidewall 16*b* extends in the right-left direction F2 orthogonal to the up-down direction F1 and the front-rear direction F3. The recess 99 extends toward one side (e.g., rearward) in the front-rear direction F3 from the second sidewall 16*b* on the recess 99 side. On the one side in the front-rear direction F3, the recess 99 extends toward one side (e.g., the right side in FIG. 14) in the right-left direction F2, that is, toward the first sidewall 16*a* farther than the second sidewall 16*b* on the recess 99 side. The recess wall 16*c* surrounds the recess 99. As illustrated in FIGS. 16 and 17, the fourth case member 18 has a U-shaped cutout 18*a* corresponding to the recess wall 16*c*. The recess wall 16*c* and the cutout 18*a* define the recess 99.

Figure 18:
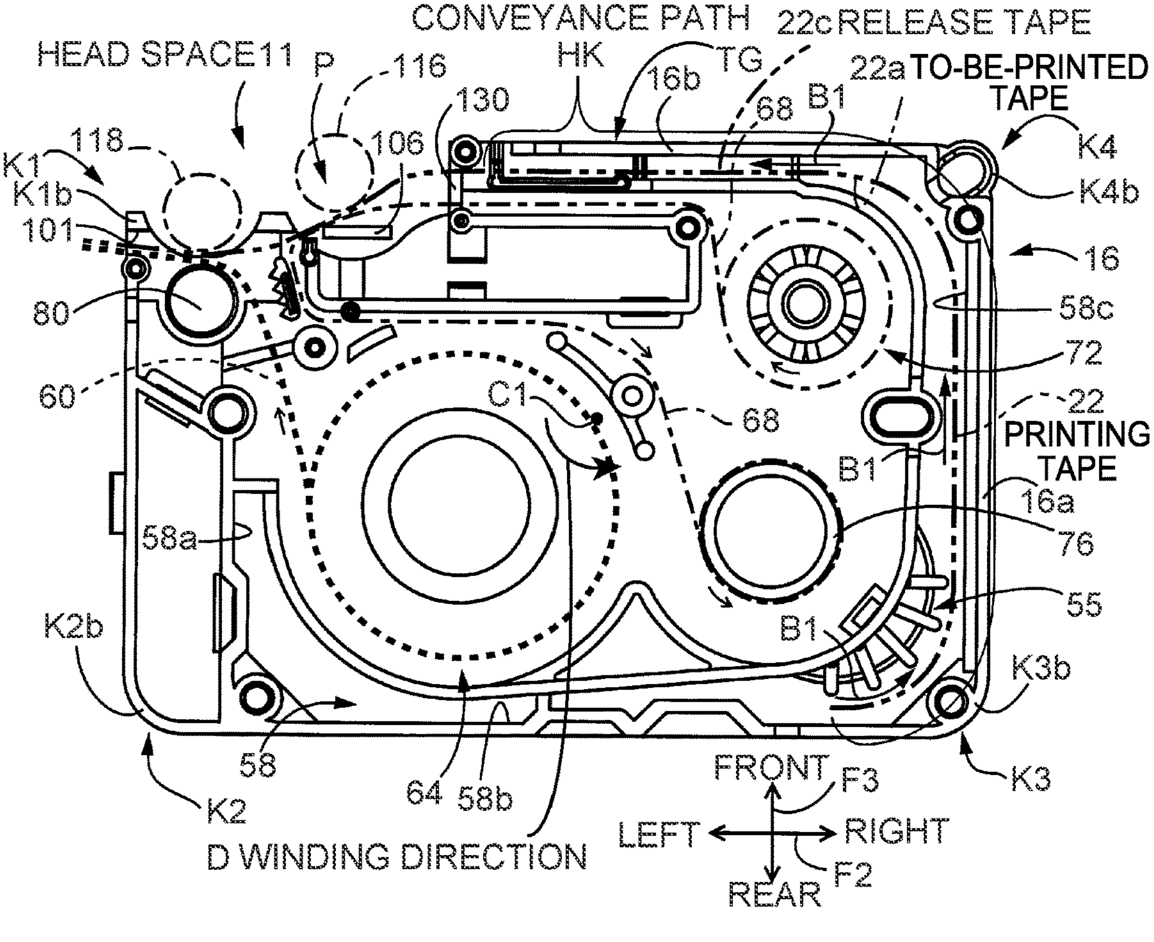
FIG. 18 is a view illustrating a path of the printing tape drawn from the printing tape roll, a path of a laminating tape drawn from a laminating tape roll, and a path of the ink ribbon drawn from an ink ribbon roll, using a view illustrating the lower surface of the third case member of FIG. 1.

FIG. 18 illustrates a lower surface of the third case member 16 when the cassette 10 is mounted on the cassette mounting portion 104. FIG. 18 illustrates a path of both of the printing tape 22 drawn from the printing tape roll 26 and the laminating tape 60 drawn from the laminating tape roll 64 by driving of the roller 80 and nipped by the roller 80 and a pressing roller 118 of the printing device 102, and a path of the ink ribbon 68 drawn from the ink ribbon roll 72 by driving of the take-up spool 76. The printing tape 22 is indicated by a double-dotted-and-dashed line. The laminating tape 60 is indicated by a dashed line. The ink ribbon 68 is indicated by a dotted-and-dashed line. In FIGS. 6 and 18, an arrow B1 is an arrow indicating a conveyance direction of the printing tape 22 drawn from the printing tape roll 26, that is, the conveyance direction in the conveyance path HK. As illustrated in FIGS. 6 and 18, the conveyance path HK is defined such that the printing tape 22 drawn from the printing tape roll 26 is conveyed in the winding direction D of the printing tape roll 26 from the first space S1 of the tape case 20 to the recessed groove 11 defined in the second space S2 of the ribbon case 21. An upstream end of the through hole 52 defined in the bottom plate 14*a* of the second case member 14 in the conveyance direction B1 of the printing tape 22, that is, an end of the first hole section 52*a* of through hole 52 on the upper side corner portion K1*a* side of the corner portion K1 is located at the upper side corner portion (e.g., a fourth corner) K1*a* of the corner portion K1.

As illustrated in FIG. 18, as the take-up spool 76 and the roller 80 are rotationally driven, the printing tape 22 and the ink ribbon 68 are discharged from an outlet 130 toward a printing position P in an overlapping manner. At the printing position P between the print head 106 and a platen, the printing tape 22 is pressed to the print head 106 via the ink ribbon 68. In this state, heating elements disposed at a surface of the print head 106 are selectively driven to generate heat locally, whereby some of ink 68*a* layered on an entire surface of the ink ribbon 68 is transferred to the printing tape 22, and characters, symbols, and other representations are printed on the printing tape 22. The used ink ribbon 68 that has passed the printing position P is taken up by the take-up spool 76. The transparent laminating tape 60 is pressed, by the roller 80, to a printed surface of the printing tape 22 that has passed the printing position P, and is thus adhered thereto. Consequently, the printed surface of the printing tape 22 is protected by the laminating tape 60. The printing tape 22 whose printed surface is protected by the laminating tape 60 is discharged from a printing tape outlet (e.g., a to-be-printed-medium outlet) 101 defined at the lower side corner portion K1*b* of the corner portion K1 of the ribbon case 21. As illustrated in FIGS. 2 and 7, the printing tape outlet 101 is located overlapping the upper side corner portion K1*a* of the corner portion K1 in a direction from the tape case 20 toward the ribbon case 21, that is, in the up-down direction F1. As illustrated in FIGS. 6 and 18, the conveyance path HK is defined such that the printing tape 22 is conveyed via the upper side corner portion K1*a* of the corner portion K1, the upper side corner portion K2*a* of the corner portion K2, the both of the upper side corner portion K3*a* of the corner portion K3 and the lower side corner portion K3*b* of the corner portion K3, and the lower side corner portion K4*b* of the corner portion K4 in this order, whereby the printing tape 22 moves from the first space S1 of the tape case 20 to the second space S2 of the ribbon case 21 to reach the printing tape outlet 101 via the recessed groove 11.

FIG. 19 illustrates a laminate of the printing tape 22 and the laminating tape 60 both discharged from the cassette 10. The laminating tape 60 is adhered to the to-be-printed tape 22*a*, that is, a printed surface, of the printing tape 22. The laminating tape 60 includes the transparent film 60*a* with the adhesive 60*b* applied to one side, that is, an inner peripheral side, of the transparent film 60*a* entirely. Thus, the ink 68*a* transferred to the printed surface of the printing tape 22 is protected.

In FIG. 20, the laminating tape roll 64, the ink ribbon roll 72, the take-up spool 76, and the roller 80 accommodated in the second space S2 between the third case member 16 and the fourth case member 18, that is, in the ribbon case 21, are indicated by a solid line. The printing tape roll 26 and the spacer films 38 accommodated in the first space S1 between the first case member 12 and the second case member 14, that is, in the tape case 20, are indicated by a double-dotted-and-dashed line (e.g., an imaginary line) on a projection plane extending orthogonal to the up-down direction F1 in the second space S2 while the printing tape roll 26 and the spacer films 38 overlap the laminating tape roll 64, the ink ribbon roll 72, the take-up spool 76, and the roller 80 in the up-down direction F1. FIG. 20 illustrates the printing tape roll 26 that is yet to be used, that is, in an initial state, the laminating tape roll 64, and the ink ribbon roll 72. As illustrated in FIG. 20, the diameter of the yet-to-be used printing tape roll 26, that is, the diameter of the printing tape roll 26 in the initial state is greater than a diameter of the laminating tape roll 64. The diameter of the laminating tape roll 64 is greater than a diameter of the ink ribbon roll 72. The diameter of the ink ribbon roll 72 is greater than a diameter of the take-up spool 76.

As illustrated in FIG. 20, the printing tape roll 26 and the spacer films 38 having the same diameter as the diameter of the printing tape roll 26 overlap at least a portion of the laminating tape roll 64, the second rotation axis C2 of the laminating tape roll 64, at least a portion of the ink ribbon roll 72, the third rotation axis C3 of the ink ribbon roll 72, at least a portion of the take-up spool 76, the fourth rotation axis C4 of the take-up spool 76, the recess 99, and at least a portion of the recess wall 16*c* in the up-down direction F1. The printing tape roll 26 overlaps the third rotation axis C3 of the ink ribbon roll 72 in the up-down direction F1. The third rotation axis C3 of the ink ribbon roll 72 is located within a projected area of the printing tape roll 26 in the up-down direction F1. The laminating tape roll 64, the second rotation axis C2 of the laminating tape roll 64, the ink ribbon roll 72, the third rotation axis C3 of the ink ribbon roll 72, the take-up spool 76, the fourth rotation axis C4 of the take-up spool 76, the recess 99, and the recess wall 16*c* are located within projected areas of the printing tape roll 26 and the spacer films 38. The recess 99 and at least a portion of the recess wall 16*c* overlap the printing tape spool 24 in the up-down direction F1. In the right-left direction F2, the first rotation axis C1 that is the rotation axis of the printing tape roll 26 and the rotation axis of the printing tape spool 24 is located between one-side end 99*a* and the other-side end 99*b* of the recess 99 in the right-left direction F2. The first rotation axis C1 that is the rotation axis of the printing tape spool 24 is located between the outlet 130 and a one-side end (e.g., a right end in FIG. 17) 99*a* of the recess 99 in the right-left direction F2. In FIG. 17, in each of the front-rear direction F3 orthogonal to the up-down direction F1 and the right-left direction F2 orthogonal to the up-down direction F1 and the front-rear direction F3, a distance between the center position M and the first rotation axis C1 of the printing tape roll 26 is less than a distance between the center position M and the recess 99. The center position M is a center of the cassette 10 in the front-rear direction F3 and the right-left direction F2. As illustrated in FIG. 20, the through hole 52 and the through hole 58 do not overlap any of the printing tape roll 26, the feed spool 70, and the take-up spool 76 in the direction from the tape case 20 toward the ribbon case 21, that is, in the up-down direction F1. As illustrated in FIG. 20, the through hole 52 and the through hole 58 are located around the first rotation axis C1 of the printing tape roll 26 and further to an outer peripheral side than the feed spool 70 and the take-up spool 76. That is, the third hole section 52*c* of the through hole 52 and the third hole section 58*c* of the through hole 58 are located around the first rotation axis C1 of the printing tape roll 26 and further to the outer peripheral side than the feed spool 70 and the take-up spool 76.

FIG. 21 illustrates the cassette mounting portion 104 that is a part of the printing device 102 included in a printing system 122. The cassette mounting portion 104 includes a positioning hole 112, the take-up spool drive shaft 108, and the roller drive shaft 110. The positioning hole 112 has a rectangular shape and positions the cassette 10 inserted therein. The take-up spool drive shaft 108 and the roller drive shaft 110 stand on a bottom of the positioning hole 112. The positioning hole 112 functions as an accommodating portion for accommodating a portion of the ribbon case 21 that is a lower case of the cassette 10. The take-up spool drive shaft 108 and the roller drive shaft 110 are rotationally driven in the opposite directions by a stepping motor via a gearing system. The cassette mounting portion 104 includes ahead holding plate 114 and a platen holding member 120. The head holding plate 114 stands on the bottom of the positioning hole 112 and holds the thermal-type print head (e.g., a thermal print head) 106 fixedly attached thereto. The platen roller 116 and the pressing roller 118 are rotatably disposed at a distal end portion of the platen holding member 120. The platen holding member 120 is pivotable about its proximal end. The head holding plate 114 is, for example, an aluminum metal plate and also serves as a heat sink of the print head 106.

As the cassette 10 is mounted on the cassette mounting portion 104 of the printing device 102, the take-up spool drive shaft 108 and the roller drive shaft 110 standing at the cassette mounting portion 104 are to be coupled to the take-up spool 76 and the roller 80, respectively. As a cover of the printing device 102 is closed with the cassette 10 mounted on the cassette mounting portion 104, the platen holding member 120 pivots about the proximal end thereof so that the platen roller 116 and the pressing roller 118 are pressed against the print head 106 and the roller 80 of the cassette 10, respectively. The printing device 102 and the cassette 10 constitute the printing system 122.

According to the cassette 10 of the illustrative embodiment, the cassette 10 includes: the case 19 including the ribbon case 21 and the tape case 20 and having the recessed groove 11 at the ribbon case 21; and the printing tape roll 26 disposed at the tape case 20 and into which the printing tape 22 is wound about the first rotation axis C1 in the winding direction D. The printing tape 22 includes the to-be-printed tape 22*a* and the release tape 22*c*. The printing tape 22 is disposed at the case 19 such that the to-be-printed tape 22*a* is on the inner side of the printing tape 22 in the winding direction D and the release tape 22*c* is on the outer side of the printing tape in the winding direction D. The case 19 has the conveyance path HK for conveying the printing tape 22. The conveyance path HK is defined such that the printing tape 22 is conveyed in the winding direction D from the printing tape roll 26 to the recessed groove 11 through the opening 52*x* defined at the boundary between the ribbon case 21 and the tape case 20 in the case 19. The printing tape 22 is thus conveyed in the winding direction D from the printing tape roll 26 to the recessed groove 11 along the conveyance path HK defined in the case 19. This may reduce a possibility that the release tape 22*c* peels off from the to-be-printed tape 22*a* due to changing of the inner side and the outer side of the printing tape 22 during conveyance of the printing tape 22 as conventionally occurred. Consequently, the printing tape 22 including the to-be-printed tape 22*a* and the release tape 22*c* may be smoothly conveyed.

According to the cassette 10 of the illustrative embodiment, the second hole section 52*b* of the through hole 52 and the second hole section 58*b* of the through hole 58 are located opposite to the recessed groove 11 in the front-rear direction F3 orthogonal to the up-down direction F1 and the right-left direction F2. The up-down direction F1 is the direction from the ribbon case 21 toward the tape case 20. The right-left direction F2 is the direction in which the printing tape 22 is conveyed in the recessed groove 11. Thus, the length of the conveyance path HK from the printing tape roll 26 to the recessed groove 11 may be extended.

According to the cassette 10 of the illustrative embodiment, the case 19 has a rectangular parallelepiped shape having four corner portions K1, K2, K3, and K4. The conveyance path HK extends to the recessed groove 11 via three corner portions K2, K3, and K4 of the four corner portions K1, K2, K3, and K4 of the case 19. Thus, the length of the conveyance path HK from the printing tape roll 26 to the recessed groove 11 may be extended.

According to the cassette 10 of the illustrative embodiment, the three corner portions K2, K3, and K4 include the upper side corner portion K2*a* of the corner portion K2, both of the upper side corner portion K3*a* and the lower side corner portions K3*b* of the corner portion K3, and the lower side corner portion K4*b* of the corner portion K4. The upper side corner portion K2*a* of the corner portion K2 is located at the tape case 20. The upper side corner portion K3*a* and the lower side corner portion K3*b* of the corner portion K3 are located at the tape case 20 and the ribbon case 21. The lower side corner portion K4*b* of the corner portion K4 is located at the ribbon case 21. The conveyance path HK is defined such that the printing tape 22 extends between the upper side corner portion K2*a* of the corner portion K2 and the both of the upper side corner portion K3*a* and the lower side corner portion K3*b* of the corner portion K3 in an inclined manner relative to the printing tape 22 wound into the printing tape roll 26. The conveyance path HK is defined such that the printing tape 22 extends between the both of the upper side corner portion K3*a* and the lower side corner portion K3*b* of the corner portion K3 and the lower side corner portion K4*b* of the corner portion K4 in an inclined manner relative to the printing tape 22 wound into the printing tape roll 26. The conveyance path HK is defined such that the printing tape 22 extends between the lower side corner portion K4*b* of the corner portion K4 and the recessed groove 11 horizontally to the printing tape 22 wound into the printing tape roll 26. The conveyance path HK is defined such that the printing tape 22 is conveyed via the upper side corner portion K2*a* of the corner portion K2, the both of the upper side corner portion K3*a*, and the lower side corner portion K4*b* of the corner portion K4 in this order, whereby the printing tape 22 moves from the tape case 20 to the ribbon case 21 to reach the recessed groove 11. Thus, when the printing tape 22 is moved from the tape case 20 to the ribbon case 21, the printing tape 22 is moved from the tape case 20 to the ribbon case 21 while the printing tape 22 is relatively gently inclined relative to the printing tape 22 wound into the printing tape roll 26, whereby twisting of the printing tape 22 may be suitably suppressed.

According to the cassette 10 of the illustrative embodiment, the case 19 further includes the upper side corner portion K1*a* of the corner portion K1 at the tape case 20. The upstream end of the through hole 52 in the conveyance direction B1 of the printing tape 22 is located at the upper side corner portion K1*a* of the corner portion K1. The case 19 has the printing tape outlet 101 at the ribbon case 21. The printing tape outlet 101 overlaps the upper side corner portion K1*a* of the corner portion K1 in the up-down direction F1 from the tape case 20 toward the ribbon case 21. The conveyance path HK is defined such that the printing tape 22 is conveyed via the upper side corner portion K1*a* of the corner portion K1, the upper side corner portion K2*a* of the corner portion K2, the both of the upper side corner portion K3*a* and the lower side corner portion K3*b* of the corner portion K3, and the lower side corner portion K4*b* of the corner portion K4 in this order, whereby the printing tape 22 moves from the tape case 20 to the ribbon case 21 to reach the printing tape outlet 101 via the recessed groove 11. Thus, the length of the conveyance path HK from the printing tape roll 26 to the recessed groove 11 may be suitably extended.

According to the cassette 10 of the illustrative embodiment, the case 19 includes the third case member 16 and the second case member 14 connected to the third case member 16. The third case member 16 has the through hole 58 in the ceiling plate 16*e* thereof. The second case member 14 includes the through hole 52 in the bottom plate 14*a* thereof. The opening 52*x* includes the through hole 58 and the through hole 52 connected to each other at the boundary at which the ceiling plate 16*e* and the bottom plate 14*a* are connected to each other. The printing tape 22 may be thus suitably conveyed from the tape case 20 to the ribbon case 21 via the through hole 58 of the third case member 16 and the through hole 52 of the second case member 14.

According to the cassette 10 of the illustrative embodiment, the cassette 10 further includes the ink ribbon 68 at the ribbon case 21. Ink of the ink ribbon 68 may be thus printed on the to-be-printed tape 22*a* of the printing tape 22.

According to the cassette 10 of the illustrative embodiment, the cassette 10 further includes the feed spool 70 for the ink ribbon 68. The third rotation axis C3 of the feed spool 70 is located within the projected area of the printing tape roll 26. The case 19 may be thus suitably downsized.

According to the cassette 10 of the illustrative embodiment, the cassette 10 further includes the feed spool 70 for the ink ribbon 68 and the take-up spool 76 for the ink ribbon 68. The through hole 52 and the through hole 58 do not overlap any of the printing tape roll 26, the feed spool 70, and the take-up spool 76 in the up-down direction F1 from the tape case 20 toward the ribbon case 21. The printing tape 22 may be thus suitably conveyed from the tape case 20 to the ribbon case 21 via the through hole 58 and the through hole 52 without contacting the supply spool 70 and the take-up spool 76.

According to the cassette 10 of the illustrative embodiment, the cassette 10 further includes the feed spool 70 for the ink ribbon 68 and the take-up spool 76 for the ink ribbon 68. The through hole 52 and the through hole 58 are located around the first rotation axis C1 of the printing tape roll 26 and further to the outer peripheral side than the feed spool 70 and the take-up spool 76. The printing tape 22 may be thus suitably conveyed from the tape case 20 to the ribbon case 21 via the through hole 58 and the through hole 52 without contacting the supply spool 70 and the take-up spool 76.

According to the cassette 10 of the illustrative embodiment, the case 19 includes the printing tape guide TG that guides the printing tape 22 at the ribbon case 21. The tape case 20 is located above the ribbon case 21. The spacing Wx of the gap SKx in the up-down direction F1 between the case 19 and the upper edge 22*x* of the printing tape 22 in the through holes 52 and 58 is greater than the spacing Wy of the gap SKy in the up-down direction F1 between the printing tape guide TG and the upper edge 22*x* of the printing tape 22 guided by the printing tape guide TG in the ribbon case 21. The printing tape 22 may be thus suitably conveyed from the tape case 20 to the printing tape guide TG of the ribbon case 21 without contacting the case 19.

The above-described embodiment is merely an example embodiment of the disclosure, and various modifications may be applied to the disclosure in the scope without departing from the spirit thereof.

For example, in the above-described embodiment, the laminating tape roll 64 is provided in the second space S2 of the ribbon case 21. Nevertheless, the laminating tape roll 64 is not necessarily provided in the second space S2 of the ribbon case 21. In other words, a printed surface of the printing tape 22 might not necessarily be protected by the laminating tape 60.

In the above-described embodiment, the supply spool 70, the ink ribbon roll 72, and the take-up spool 76 are provided in the second space S2 of the ribbon case 21. Nevertheless, the supply spool 70, the ink ribbon roll 72, and the take-up spool 76 are not necessarily provided in the second space S2 of the ribbon case 21. That is, a heat-sensitive sheet is used as the to-be-printed tape 22*a* of the printing tape 22. This may omit the supply spool 70, the ink ribbon roll 72, and the take-up spool 76 from the cassette 10.

In the above-described embodiment, the laminating tape roll 64, the supply spool 70, the ink ribbon roll 72, and the take-up spool 76 are provided in the second space S2 of the ribbon case 21. Nevertheless, the laminating tape roll 64, the supply spool 70, the ink ribbon roll 72, and the take-up spool 76 are not necessarily provided in the second space S2 of the ribbon case 21. That is, a heat-sensitive sheet is used as the to-be-printed tape 22*a* of the printing tape 22 and a printed surface of the printing tape 22 is not protected by the laminating tape 60. This may omit the laminating tape 60, the laminating tape roll 64, the feed spool 70, the ink ribbon roll 72, and the take-up spool 76 from the cassette 10.

In the above-described embodiment, the ribbon case 21 and the tape case 20 are stacked one above another in the case 19. Nevertheless, for example, another case member may be disposed between the ribbon case 21 and the tape case 20. In the above-described embodiment, the conveyance path HK extends to the recessed groove 11 via the three corner portions K2, K3, and K4 of the four corner portions K1, K2, K3, and K4 of the case 19. Nevertheless, for example, the route of the case 19 may be changed such that the conveyance path HK extends to the recessed groove 11 via the four corner portions K1, K2, K3, and K4. That is, the route of the case 1*q*9 may be changed such that the conveyance path HK extends to the recessed groove 11 via at least three corner portions K2, K3, and K4 of the four corner portions K1, K2, K3, and K4 of the case 19.

The above-described embodiment is merely an example embodiment of the disclosure, and various modifications may be applied to the disclosure in the scope without departing from the spirit thereof.

What is claimed is:

1. A cassette comprising:

a case including a first case, a second case and a plate, and having a head space at the first case; and a roll disposed at the second case and into which a medium to be printed is wound about a rotation axis in a winding direction, the rotation axis extending in a first direction, wherein:

the medium to be printed includes a to-be-printed layer and a release layer, the medium to be printed is disposed at the case such that the to-be-printed layer is on an inner side of the medium to be printed in the winding direction and the release layer is on an outer side of the medium to be printed in the winding direction;

the case has a conveyance path for conveying the medium to be printed;

the first case and the second case are arranged in the first direction;

the plate is positioned between the roll and the head space in the first direction, the plate having an opening; and the conveyance path is defined such that the medium to be printed is conveyed in the winding direction from the roll to the head space through the opening.

2. The cassette according to claim 1, wherein the opening is located opposite to the head space in a third direction orthogonal to the first direction and a second direction, the first direction being a direction from the first case toward the second case, the second direction being a direction in which the medium to be printed is conveyed in the head space.

3. The cassette according to claim 1, wherein:

the case has a rectangular parallelepiped shape having four corner portions; and the conveyance path extends to the head space via at least three corner portions of the four corner portions of the case.

4. The cassette according to claim 3, wherein:

the three corner portions include a first corner portion, a second corner portion, and a third corner portion;

the first corner portion is located at the second case;

a portion of the second corner portion is located at either of the first case and the second case;

the third corner portion is located at the first case;

the conveyance path is defined such that the medium to be printed extends between the first corner portion and the second corner portion in an inclined manner relative to the medium to be printed wound into the roll;

the conveyance path is defined such that the medium to be printed extends between the second corner portion and the third corner portion in an inclined manner relative to the medium to be printed wound into the roll;

the conveyance path is defined such that medium to be printed extends between the third corner portion and the head space horizontally to the medium to be printed wound into the roll; and the conveyance path is defined such that the medium to be printed is conveyed via the first corner portion, the second corner portion, and the third corner portion in this order, whereby the medium to be printed moves from the second case to the first case to reach the head space.

5. The cassette according to claim 4, wherein:

the case further includes a fourth corner portion at the second case;

an upstream end of the opening in a conveyance direction of the medium to be printed is located at the fourth corner portion;

the case has a to-be-printed-medium outlet at the first case, the to-be-printed-medium outlet overlapping the fourth corner portion in a direction from the second case toward the first case; and the conveyance path is defined such that the medium to be printed is conveyed via the fourth corner portion, the first corner portion, the second corner portion, and the third corner portion in this order, whereby the medium to be printed moves from the second case to the first case to reach the to-be-printed-medium outlet via the head space.

6. The cassette according to claim 1, further comprising an ink ribbon at the first case.

7. The cassette according to claim 6, further comprising a feed spool for the ink ribbon, wherein a feed axis of the feed spool is located within a projected area of the roll.

8. The cassette according to claim 6, further comprising a feed spool for the ink ribbon and a take-up spool for the ink ribbon, wherein the opening does not overlap any of the roll, the feed spool, and the take-up spool in a direction from the second case toward the first case.

9. The cassette according to claim 6, further comprising a feed spool for the ink ribbon and a take-up spool for the ink ribbon, wherein the opening is located around the rotation axis of the roll and further to an outer side than the feed spool and the take-up spool.

10. The cassette according to claim 1, wherein:

the case includes a guide for the medium to be printed at the first case;

the second case is located above the first case; and a spacing of a gap in a direction from the second case toward the first case between the case and an upper edge of the medium to be printed in the opening is greater than a spacing of a gap in the direction from the second case toward the first case between the guide and the upper edge of the medium to be printed in the first case.

11. A cassette comprising:

a case including a first case, a second case and a plate, and having a head space at the first case; and a roll disposed at the second case and into which a medium to be printed including a to-be-printed layer and a release layer is wound about a rotation axis such that the to-be-printed layer is on an inner side of the medium to be printed, the rotation axis extending in a first direction, wherein:

the case has a conveyance path for conveying the medium to be printed;

the first case and the second case are arranged in the first direction;

the plate is positioned between the roll and the head space in the first direction, the plate having an opening; and the conveyance path is defined such that the medium to be printed is conveyed from the roll to the head space through the opening.

12. The cassette according to claim 11, wherein:

in the roll, the medium to be printed is wound about the rotation axis in a winding direction; and the conveyance path is defined such that the medium to be printed is conveyed in the winding direction from the roll to the head space in at least a section of the conveyance path.

13. The cassette according to claim 12, wherein the conveyance path is defined such that the medium to be printed is conveyed in the winding direction from the roll to the head space in all sections of the conveyance path.

14. The cassette according to claim 11, wherein:

the roll is a second roll; and the cassette further including a first roll into which a material is wound, disposed at the first case, the material engageable with the medium to be printed on the conveyance path.

15. The cassette according to claim 14, the material is one of a ribbon and a tape.

* * * * *